(12) United States Patent
Kahn et al.

(10) Patent No.: US 11,736,680 B2
(45) Date of Patent: Aug. 22, 2023

(54) SYSTEM AND METHOD FOR DISPLAYING A THREE-DIMENSIONAL IMAGE

(71) Applicant: Looking Glass Factory, Inc., Brooklyn, NY (US)

(72) Inventors: Evan Kahn, Brooklyn, NY (US); Alexander Duncan, Brooklyn, NY (US); Shiu Pong Lee, Brooklyn, NY (US); Alexis Hornstein, Brooklyn, NY (US); Shawn Michael Frayne, Brooklyn, NY (US); Caleb Johnston, Brooklyn, NY (US)

(73) Assignee: Looking Glass Factory, Inc., Brooklyn, NY (US)

( * ) Notice: Subject to any disclaimer, the term of this patent is extended or adjusted under 35 U.S.C. 154(b) by 0 days.

(21) Appl. No.: 17/724,369

(22) Filed: Apr. 19, 2022

(65) Prior Publication Data

US 2022/0337806 A1 Oct. 20, 2022

Related U.S. Application Data

(60) Provisional application No. 63/210,104, filed on Jun. 14, 2021, provisional application No. 63/176,467, filed on Apr. 19, 2021.

(51) Int. Cl.
*G09G 5/00* (2006.01)
*H04N 13/395* (2018.01)
*H04L 9/08* (2006.01)
*H04N 13/327* (2018.01)
*H04N 13/302* (2018.01)

(52) U.S. Cl.
CPC ......... *H04N 13/395* (2018.05); *H04L 9/0866* (2013.01); *H04N 13/302* (2018.05); *H04N 13/327* (2018.05)

(58) Field of Classification Search
CPC .. H04N 13/395; H04N 13/327; H04N 13/302; H04L 9/0866
USPC ............................................................. 345/6
See application file for complete search history.

(56) References Cited

U.S. PATENT DOCUMENTS

| | | |
|---|---|---|
| 5,012,274 A | 4/1991 | Dolgoff |
| 6,377,702 B1 | 4/2002 | Cooper |
| 6,847,396 B1 | 1/2005 | Lin |
| 10,855,965 B1 | 12/2020 | Jiao et al. |
| 10,893,262 B2 | 1/2021 | Vetter et al. |
| 2010/0026712 A1 | 2/2010 | Aliprandi et al. |

(Continued)

FOREIGN PATENT DOCUMENTS

TW 201215102 A 4/2012

OTHER PUBLICATIONS

"High efficiency video coding", International Telecommunication Union, Nov. 2019.

(Continued)

*Primary Examiner* — Jonathan M Blancha
(74) *Attorney, Agent, or Firm* — Jeffrey Schox; Randy Mehlenbacher

(57) ABSTRACT

A method or system can be configured to receive content associated with a scene; optionally, format the content as a three-dimensional image; render the content or three-dimensional image in a display-readable format; optionally, authenticate the display; and display the formatted content such that the formatted content is perceivable as three-dimensional for one or more viewers.

20 Claims, 13 Drawing Sheets

(56) References Cited

U.S. PATENT DOCUMENTS

| | | |
|---|---|---|
| 2010/0091206 A1 | 4/2010 | Chapman |
| 2011/0187563 A1 | 8/2011 | Sanders-Reed |
| 2012/0051631 A1 | 3/2012 | Nguyen et al. |
| 2012/0297413 A1* | 11/2012 | Choi .............. H04N 7/165 725/25 |
| 2013/0107336 A1 | 5/2013 | Wey et al. |
| 2013/0336599 A1 | 12/2013 | Richards et al. |
| 2014/0198030 A1 | 7/2014 | Takazawa |
| 2014/0282969 A1* | 9/2014 | Ye .............. G06F 21/45 726/7 |
| 2014/0314235 A1 | 10/2014 | Matischek |
| 2014/0347362 A1 | 11/2014 | Maleki et al. |
| 2015/0326398 A1 | 11/2015 | Modarresi et al. |
| 2016/0088287 A1 | 3/2016 | Sadi et al. |
| 2016/0105658 A1 | 4/2016 | Choo et al. |
| 2016/0187850 A1 | 6/2016 | Oh |
| 2018/0061365 A1* | 3/2018 | Lee .............. G09G 3/2092 |
| 2018/0063519 A1 | 3/2018 | Smithwick et al. |
| 2018/0288387 A1 | 10/2018 | Somanath et al. |
| 2019/0011621 A1 | 1/2019 | Karafin et al. |
| 2019/0052166 A1 | 2/2019 | Ali et al. |
| 2019/0052466 A1 | 2/2019 | Bettger |
| 2019/0219832 A1 | 7/2019 | Yang et al. |
| 2019/0253697 A1 | 8/2019 | Kim et al. |
| 2020/0019717 A1* | 1/2020 | Steffey .............. H04L 9/3239 |
| 2021/0055690 A1 | 2/2021 | Kim |
| 2021/0350918 A1* | 11/2021 | Paul .............. G06F 21/6245 |

OTHER PUBLICATIONS

"Light Field Capture and Distribution Update From Display Summit 2018", Display Daily, published Apr. 2019, https://vww.displaydaily.com/paid-news/ldm-mdm/ldm-mdm-event-reports/ldmmdm-event-round-up/light-field-capture-and-distribution-update-from-display-summit-2018.

"Looking Glass Calibration", http://stereo.jpn.org/eng/stphmkr/lg_cibration/index.html, downloaded Mar. 24, 2020.

"Looking Glass Learn", https://learn.lookingglassfactory.com, downloaded Mar. 24, 2020.

"StereoPhoto Maker Ver5.30 Update", http://stereo.jpn.org/eng/stphmkr/lg/530.html, downloaded Mar. 18, 2020.

Bao, Wenbo, et al., "Depth-Aware Video Frame Interpolation", arXiv:1904.00830v1, Apr. 1, 2019.

Bourbakis, N., et al., "Picture Data Encryption Using Scan Patterns", Pattern Recognition, vol. 25, No. 6, pp. 567-581, 1992.

Eden, Murray, et al., "Polynomial Representation of Pictures", Signal Processing 10 (1986) 385-393.

Wu, Gaochang, et al., "Light Field Image Processing: An Overview", Article in IEEE Journal of Selected Topics in Signal Processing—Aug. 2017.

Yu, Zhan, "Light Field Imaging", Dissertation submitted to the Faculty of the University of Delaware, Fall 2013.

* cited by examiner

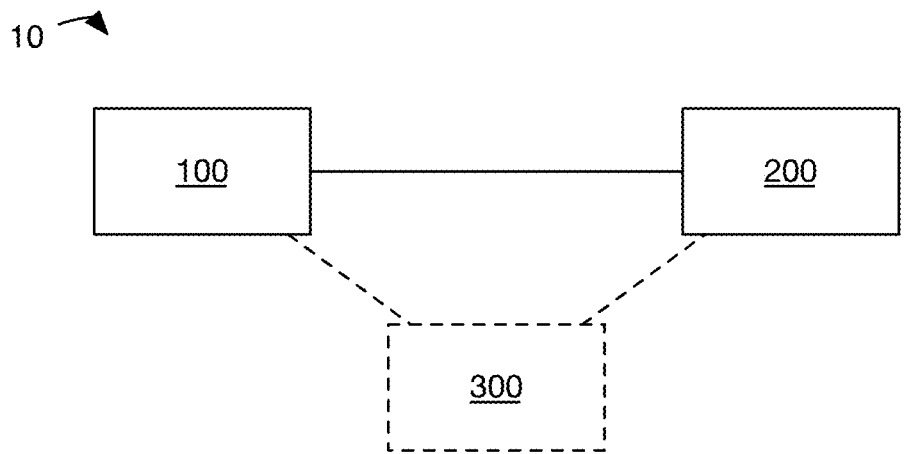
FIGURE 1
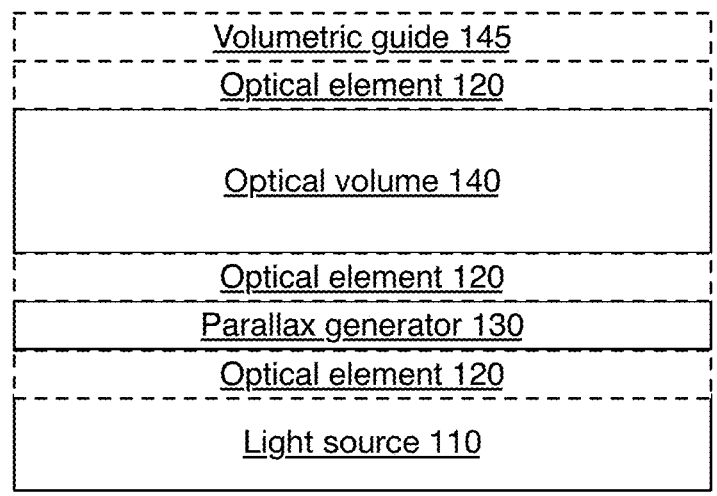
FIGURE 2
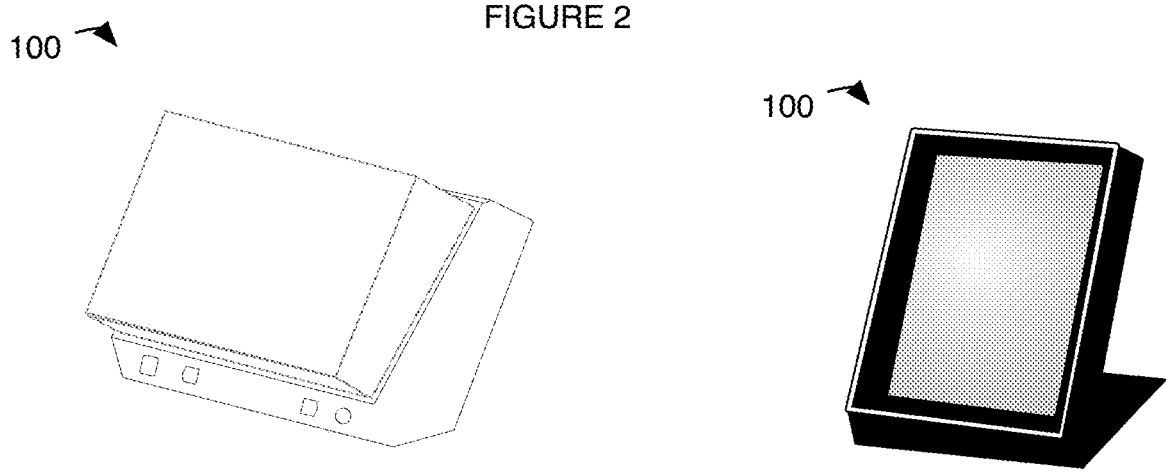
FIGURE 3A                    FIGURE 3B

SYSTEM AND METHOD FOR DISPLAYING A THREE-DIMENSIONAL IMAGE

CROSS-REFERENCE TO RELATED APPLICATIONS

This application claims the benefit of U.S. Provisional Application No. 63/176,467, filed 19 Apr. 2021 and U.S. Provisional Application No. 63/210,104 filed 14 Jun. 2021, each of which is incorporated in its entirety by this reference.

TECHNICAL FIELD

This invention relates generally to the display field, and more specifically to a new and useful system and method in the display field.

BRIEF DESCRIPTION OF THE FIGURES

FIG. 1 is a schematic representation of the system.

FIG. 2 is a schematic representation of an example of a display.

FIGS. 3A and 3B are schematic representations of examples of displays.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

As shown in FIG. 1, the system 10 includes a display and a computing system. The system optionally includes an identification system, a user interface, and/or any suitable components.

Figure 4:
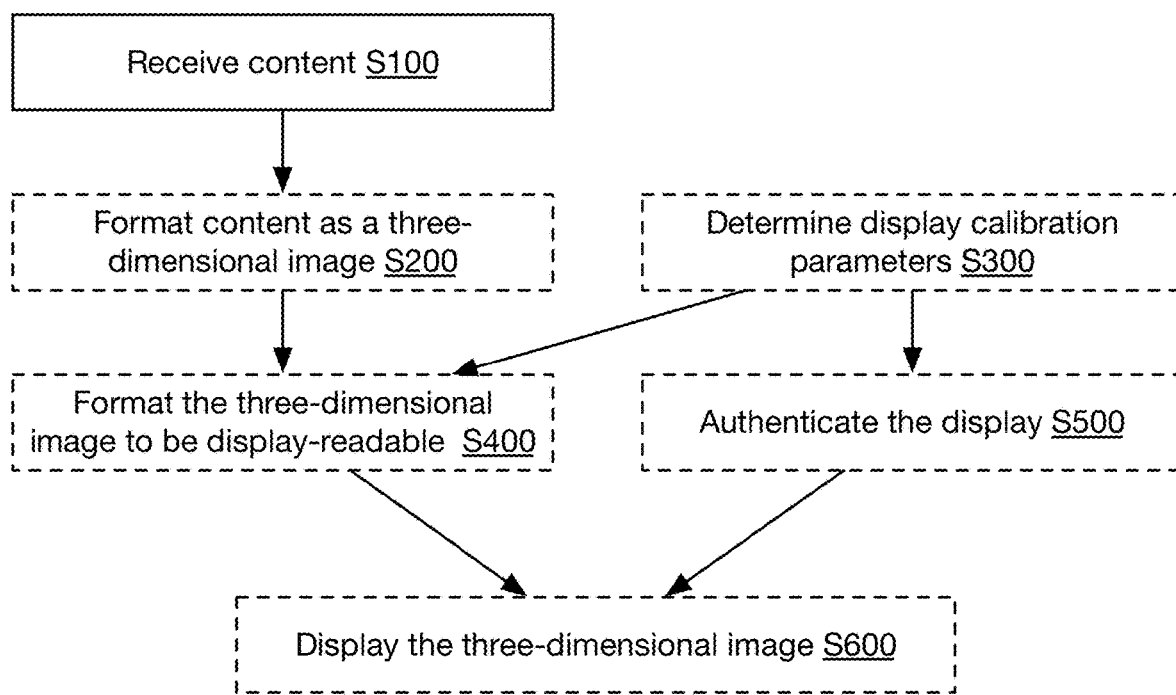
FIG. 4 is a schematic representation of the method.

As shown in FIG. 4, the method 20 can include receiving content, formatting the content as a three-dimensional image, determining calibration parameters, formatting the three-dimensional image to be display-readable, authenticating the display, displaying the three-dimensional image, and/or any suitable steps.

The system and method can function to verify that a device is authorized to use a software (e.g., that the device and software were produced by the same entity), verify that a user is an authorized user, format content as a three-dimensional image, display three-dimensional images of a scene (e.g., based on calibration parameters), and/or can otherwise function.

2. Benefits

Variations of the technology can confer several benefits and/or advantages.

First, variants of the technology can ensure that only authorized users (e.g., the user who purchased the display, members of an organization that purchased the display, etc.) can access and use the display and/or that software provided by an entity is used to operate a display provided by the same entity. In a first example, comparing the calibration parameters stored on the display to calibration parameters stored on at a remote computing system (e.g., remote from the display, cloud computing system, server, etc.) can be used to authenticate the display (e.g., authenticate the display when the calibration parameters match). In a second example, the display can be authenticated using a shared secret (e.g., a checksum) independently stored by the display and the computing system (e.g., on the server, on a local computing system, etc.).

Second, variants of the technology can ensure that three-dimensional images (e.g., stereoscopic image(s), superstereoscopic images such as to display a plurality of stereoscopic images contemporaneously to produce a plurality of perspectives, holographic image, lightfield image, etc.) output by the display are not distorted. The three-dimensional image output by the display may appear nonsensical and/or distorted, for example, if the calibration parameters for the display are unknown or incorrect. In specific examples, authenticating the calibration parameters can ensure that the correct calibration parameters are used for display operation.

Third, variants of the technology can enable full-feed-through preparation of content to be displayed as a three-dimensional image (and/or video). For example, a single executable (e.g., program, application, etc.) can prepare a three-dimensional image (e.g., convert content from a plurality of formats into a common three-dimensional format), format the three-dimensional image for display on the display (e.g., align views to the display, align images to stereo-glasses, identify left and right stereo images, align views to particular pixels or subpixels of the display, etc.), authenticate the display (e.g., based on the display calibration), transmit information associated with the three-dimensional image (e.g., metadata, shader, rendering information, etc. that can be used to format the three-dimensional image to be displayed by a display), and/or can otherwise prepare a display and/or content for displaying a three-dimensional image.

However, variants of the technology can confer any other suitable benefits and/or advantages.

3. System

The display functions to present a three-dimensional image (e.g., a lightfield image, a 3D image, a holographic-like image, etc.) of a scene. The display preferably presents the three-dimensional image without using peripherals (e.g., glasses, goggles, polarizing films, headsets, etc.), but the display can use peripherals. The three-dimensional image is preferably viewable by a plurality of viewers at once (e.g., each viewer can see different perspectives of the scene at the same time, each viewer can see the same perspective of the scene at the same time, etc.). However, the display can accommodate a single viewer and/or any suitable number of viewers. The three-dimensional image can include any suitable number of views (e.g., images of the scene such as showing different perspectives) between 1-1000 views such as 2, 4, 8, 12, 20, 45, 50, 75, 90, 100, 135, 150. However, the three-dimensional image can include any suitable number of views. Each viewer preferably perceives a plurality of views (e.g., 1 view per eye, more than one view per eye), but each viewer can perceive a single view and/or any suitable number of views. Perceiving a plurality of views can function to enable (and/or enhance) the viewer perception of depth (and/or perspective) of the scene in the three-dimensional image.

The display preferably operates based on a set of operation parameters. The operation parameters can include: number of viewers, mode of operation (e.g., interactive mode; display mode; static mode such as to display a still image; dynamic mode such as to display a video; tracked or untracked mode; bounded viewer mode or unbounded viewer mode; a mode of operation as disclosed in U.S. patent application Ser. No. 17/326,857 titled 'SYSTEM AND METHOD FOR HOLOGRAPHIC IMAGE DISPLAY' filed 21 May 2021 incorporated in its entirety by this reference; etc.), brightness, contrast, color mode (e.g., black and white, RGB, etc.), calibration parameters (e.g., alignment between the display pixel grid and the lenticular grid, alignment between the display pixels and the parallax generator, aligned between the display subpixels and the parallax generator, lenticule slope, lenticule center, lenticule pitch, serial number, model number, change in lenticule slope, change in lenticule center, change in lenticule pitch, viewcone inversion, etc.), pixel (and/or subpixel) arrangement, power, and/or any suitable operation parameters.

The display is preferably divided into a plurality of pixels. The pixels are preferably arranged on a pixel grid, but can be arranged in any suitable manner. The pixel grid is preferably a regular grid such as a linear grid, a curvilinear grid, skewed grid, and/or any suitable regular grid. However, the pixel grid can be irregular (e.g., include non-equal spacing). Each pixel can be square, rectangular, circular, oblate, polygonal, and/or any suitable shape. Each pixel can be in contact with neighboring pixels and/or separated from neighboring pixels by a separation distance. Each pixel can be individual addressable or addressable in sets of pixels.

Each pixel 115 can include one or more sub-pixels 118. In a specific example, each pixel can include three sub-pixels wherein each sub-pixel corresponds to a different color (e.g., a red sub-pixel, a blue sub-pixel, and a green sub-pixel). In a second specific example, each pixel can correspond to five sub-pixels. However, each pixel can correspond to any suitable number and/or type of sub-pixels. Each sub-pixel can be square, rectangular, circular, oblate, polygonal, chevron-shaped, triangular, diamond-shaped, quincunx, and/or any suitable shape. Examples of sub-pixel geometries include: RGB (e.g., red green blue), BGR, alternating RBG (e.g., a first pixel row can be RGB and an adjacent pixel row can be GBR), chevron RGB, RGBY (e.g., red green blue yellow), VRGB, VBGR, RGGB, BGBR, shifted BRBG, alternating BGBR, PenTile (e.g,. RGWRGB, RGBW, RGBG, GRGB, etc.) GRBG (e.g., Bayer filter), WRBG (e.g,. white red blue green), CRBG (e.g., cyan red blue green), CYGM (e.g., cyan yellow green magenta), CYYM, and/or any suitable filter and/or sub-pixel arrangement can be used.

As shown in FIG. 2, FIG. 3A, and FIG. 3B, the display can include one or more: light source 110, parallax generators 130, optical volume 140, optical elements 120, and/or any suitable components.

The light source preferably functions to output light. The light source can include one or more light emitters. Each light emitter can illuminate one or more pixels (e.g., display pixel 115). Each light emitter can be white (e.g., outputs optical radiation that covers most of the visible spectrum) and/or colored (e.g., output specific wavelengths of optical radiation such as red light 635-700 nm, orange light 590-635 nm, yellow light 560-590 nm, green light 520-560 nm, cyan light 490-520 nm, blue light 450-490 nm, violet light 400-450 nm, ultraviolet light such as 100-400 nm, UV-A, UV-B, UV-C, etc.; output discrete wavelengths of light such as neon lamps, sodium lamps, wavelengths based on atomic transitions, wavelengths based on electronic transitions, etc.; etc.). In specific examples, the light source (and/or one or more light emitters of the light source) can be: a light-emitting diode (e.g., an organic light emitting diode, a quantum dot LED, microLED, etc.), an electroluminescent panel, a cold cathode fluorescent lamp, a hot cathode fluorescent lamp, external electrode fluorescent lamp, incandescent lightbulb, ambient light, sunlight, and/or any suitable light source.

The optical element(s) 120 preferably function to change characteristics of the emitted light. The optical elements can function to reduce stray light (e.g., light that bypasses the pixels) from reaching a viewer. Characteristics of the emitted light can include: intensity, wavelength (e.g., color), spatial location of the emission of the optical radiation from the display (e.g., viewing angle where a given pixel is perceived), polarization, phase, collimation, and/or any suitable characteristics. The optical elements can be arranged between the light source and the optical volume, between the light source and the parallax generator, behind the light source, on a surface of the optical volume, independent of the display, and/or at any suitable location. Examples of optical elements can include: polarizers (e.g., wire-grid, transmission, reflection, absorption, etc.), waveplates (e.g., half waveplates, quarter waveplates, etc.), lenses (e.g., spherical, aspherical, cylindrical, any suitable focal length such as between 10 mm and 100 mm, etc.), neutral density filter, color filter (e.g., reflective filters, absorptive filters, etc.), spatial light modulators (e.g., electrooptic modulators, liquid crystals, microelectromechanical (MEMS) mirrors, etc.), and/or any suitable optical elements.

In an illustrative example, a set of optical elements, such as associated with a subpixel of the display, can include a first polarizer configured to allow optical radiation of a first polarization state to pass through the first polarizer, a color filter configured to transmit optical radiation of a predetermined color (such as red, green, or blue), a liquid crystal, and a second polarizer configured to allow optical radiation of a second polarization state to pass through the second polarizer. In this specific example, the second polarization state can be orthogonal to the first polarization state. When the liquid crystal is turned on (e.g., when a voltage is applied), the set of optical elements can prevent light from being emitted. When the liquid crystal is turned off (e.g., when no voltage is applied, when a voltage below a threshold voltage is applied), the set of optical elements can enable light to be emitted. However, the set of optical elements can be arranged in any suitable order, include any suitable components, and operate in any suitable manner.

The parallax generator 130 functions to provide (and/or appear to provide) different views of a scene to a viewer (e.g., a different view to each eye of a viewer, different views to each viewer, views that depend on the viewers location relative to the display, etc.). The parallax generator can be above the light source (e.g., along the light propagation direction), optical elements, above the optical volume, and/or arranged in any suitable location. For example, during use the parallax generator is preferably between the light source and the viewer(s). The parallax generator can be separated from (e.g., by a separation distance such as generated by a housing, by optical elements, etc.) and/or in contact with the light source, optical elements, the optical volume, and/or any suitable component. The parallax generator is preferably a lenticular array 135, but can be a parallax barrier (e.g., a series of baffles aligned to pixels and/or subpixels of the display), a fly-eye lens array, and/or any suitable parallax generator.

The parallax generator preferably includes a set of lenses arranged on a grid (e.g., each corner of the grid corresponds to a lens, each edge corresponds to a lens, etc.). The grid is preferably a regular grid such as a linear grid, a curvilinear grid, skewed grid, and/or any suitable regular grid. The grid can be a 1-D grid, a 2-D grid, a 3-D grid, and/or be arranged in any spatial manner. However, the grid can be irregular (e.g., include non-equal spacing). Each lens of the set of lenses is preferably identical (e.g., shape, size, focal length, material, etc.). However, one or more lens of the set of lenses can be different.

The pitch (e.g., the separation distance between lenses such as along a lateral extent of the lenticular array, along a longitudinal extent of the lenticular array, etc.) can be any suitable value between 10 μm and 1 mm. However, the pitch can be any suitable value.

The shape of each lens can be spherical, aspherical, cylindrical, axicon, Fresnel lens, and/or any suitable shape. Each lens can be a microlens (e.g., have a lens diameter less than about 1 mm such as 10 μm, 50 μm, 100 μm, 250 μm, etc.). However, each lens can have any suitable size (e.g., larger than 1 mm). The focal length for each lens can be any suitable value between about 10 μm and 1 mm. However, the focal length can be any suitable value. The material for each lens can be plastic (e.g., acrylic such as PMMA, APET, PETG, LENSTAR®Plus, Polycarbonate, Polypropylene, PVC, polystyrene, etc.), glass, liquid crystals, and/or any suitable material can be used.

Figure 6:
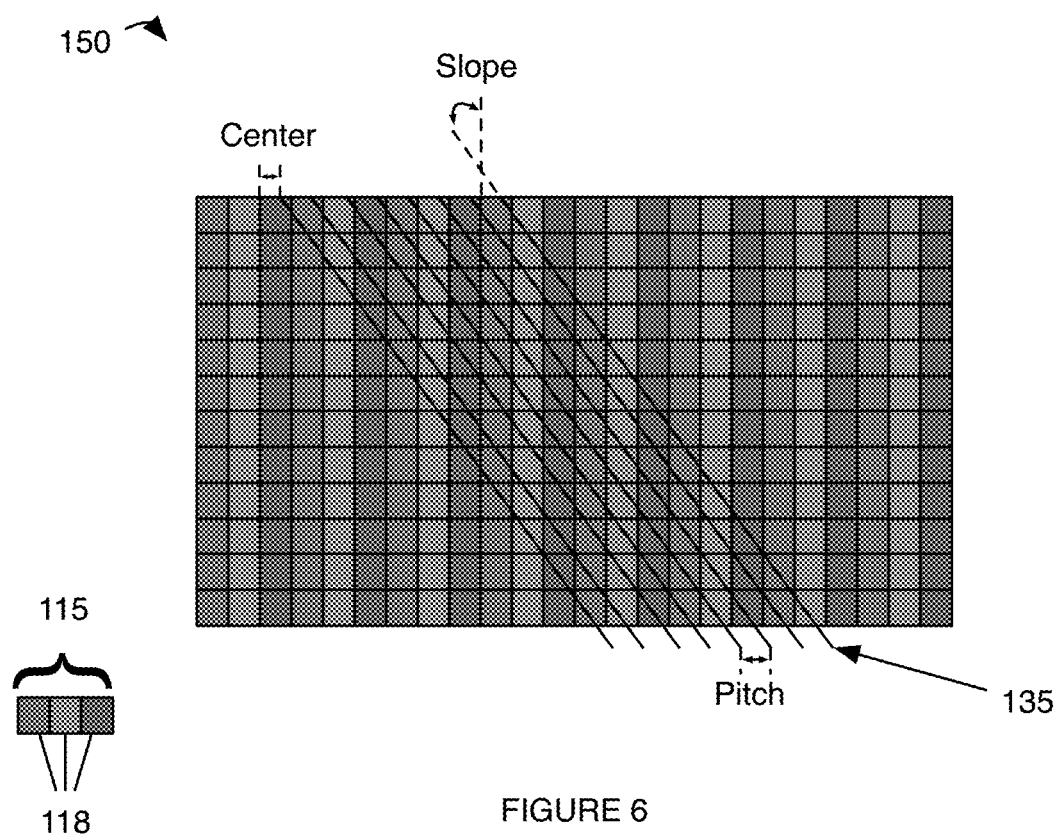
FIG. 6 is a schematic representation of an example of calibration parameters of an example display.

The lenticular array is preferably aligned to intersect the pixels (e.g., sub-pixels) of the display. In a specific example, as shown in FIG. 6, when the lenticular grid and pixel grid are square (and/or rectangular), the lenticular grid can be rotated by an angle (e.g., between 0-90°) relative to the pixel grid. This angle can be referred to as the slope. However, the lenticular grid and the pixel grid can be parallel (e.g., have an angle or slope of 0°), perpendicular (e.g., have an angle or slope equal to 90°), and/or can be aligned in any suitable manner. Each lenticule can be associated with a plurality of pixels (and/or sub-pixels thereof).

The separation between the center of a lens of the lenticular array and the center of a pixel (and/or sub-pixel) can be referred to as 'center.' The center is preferably 0 mm, but can be any suitable value between 0 mm and 100 μm and/or any suitable value. The center can be defined for a single lenticule and pixel or single lenticule and sub-pixel pair (e.g., a first lenticule, a center lenticule, a representative lenticule, etc.), can be an average value (e.g., average separation between lenticules and nearest pixel or sub-pixels), and/or can be any suitable value.

However, any suitable parallax generator can be used.

The parallax generator can optionally include (e.g., be mounted to, be connected to, etc.) a flip controller (e.g., a privacy screen, privacy barrier, etc.), which can function to reduce an amount of light transmitted in unintended (e.g., undesirable, unpreferred, etc.) directions. The flip controller can include baffles, louvers, and/or any suitable structures. For example, the display can include a flip controller (e.g., privacy film) as disclosed in U.S. patent application Ser. No. 17/332,479 titled 'SYSTEM AND METHOD FOR HOLOGRAPHIC DISPLAYS' filed 27 May 2021 and incorporated in its entirety by this reference.

The optical volume 140 can function to enhance the perception of the three-dimensional image (e.g., depth perception, immersiveness, etc.). For instance, the optical volume can improve the separation between views, change the apparent size of objects in the view(s) (e.g., magnify or reduce an image), provide an anchor for view perception, and/or can otherwise enhance the perception of the three-dimensional image. The optical volume is preferably in contact with the parallax generator, but can be in contact with the optical elements, the light source, separate or separated from the parallax generator, optical elements, light source, and/or can otherwise be arranged relative to any suitable component.

The optical volume is preferably transparent (e.g., transmits >90% of visible radiation), but can be semi-transparent (e.g., transmits >10%, >25%, >50%, >75%, >80%, etc. of visible radiation), reflective, and/or can have any suitable optical scattering properties. The optical volume can have any suitable index of refraction between about 0 and 3 such as 1.3, 1.35, 1.4, 1.45, 1.5, 1.6, 1.7, 1.75, 2, 2.5, 3, and/or any suitable index of refraction. The optical volume is preferably a rectangular prism, but can be any suitable three dimensional shape.

The optical volume can be made of the same material as the lenticular array and/or a different material. For example, the optical volume can be composed of polymer (e.g., polymethylmethacrylate (PMMA) such as acrylic, polyphosphonate, polyphosphazene, polyferrocenes, polyferrocenylsilanes, Polycarbodiimide, polymer nanocomposites, etc.), glass (e.g., flint glass), liquids (e.g., water, oil, etc.), crystals (e.g., diamond, sapphire, silicon carbide, quartz, zirconia, ZnTe, ITO, titanium oxide, silicon nitride, etc.), and/or any suitable material.

The optical volume can optionally include volumetric guides 145 which can function to enhance the optical perception of the three-dimensional image by providing a reference plane within the viewers perception. The volumetric guides can be reflective, transmissive, scattering, and/or have any suitable optical properties. The volumetric guides can surround the optical volume, surround part of the optical volume, be at discrete points, and/or be arranged in any location. The volumetric guides can have any suitable shape.

In a first specific example, the optical volume can be defined by a frame surrounding the optical. In these embodiments, the optical volume can be a volume (e.g., of air, free space, etc.) enclosed or surrounded by the frame, extend into an external environment proximal the frame (including or excluding the enclosed volume), and/or can otherwise be arranged. For instance, as shown in FIG. 3B, a frame can include one or more reflective (e.g., mirrored) surfaces directed toward the optical volume. The surfaces can act as volumetric guides. In variations of this specific example, the optical volume can be in free space (e.g., air), which can enable a viewer to directly interact with the free space 3D image. However, the optical volume can be an enclosed volume (e.g., where a viewer cannot directly interact with the free-space 3D image; a high index optical block for instance with an index of refraction n≥1.4, 1.5, 1.6, 1.7, 1.8, 2.0, etc.; as shown in FIG. 3A; etc.), be defined by a surface of an optical components, and/or have any suitable properties.

Exemplary displays can include: computer monitors, tablets, laptops, smart phones, extended reality (XR) devices (e.g., augmented reality (AR) devices, mixed reality (MR) devices, virtual reality (VR) devices, etc.), virtual reality headsets (e.g., Oculus, HTC Vive, Valve, Sony PlayStation VR, etc.), augmented reality headsets (e.g., smart glasses, Microsoft HoloLens, Heads Up Displays, handheld AR, holographic display, etc.), superstereoscopic display (e.g., a display as disclosed in U.S. Pat. No. 10,191,295 entitled 'ADVANCED RETROREFLECTING AERIAL DISPLAYS' filed on 5 Jan. 2018, U.S. patent application Ser. No. 17/328,076 filed 24 May 2021 titled 'SUPERSTEREOSCOPIC DISPLAY WITH ENHANCED OFF-ANGLE SEPARATION', U.S. patent application Ser. No. 17/332,479 filed 27 May 2021 titled 'SYSTEM AND METHOD FOR HOLOGRAPHIC DISPLAYS', and/or U.S. patent application Ser. No. 17/326,857 filed 21 May 2021 titled 'SYSTEM AND METHOD FOR HOLOGRAPHIC IMAGE DISPLAY', each of which is incorporated in its entirety by this reference; etc.), holographic displays (e.g., Sony Spatial Reality Display, Lume Pad, etc.), and/or any suitable display(s) can be used.

The computing system 200 functions to process content and/or three-dimensional images, format content and/or three-dimensional images, calibrate the display, authenticate the display, perform a method (e.g., as disclosed below), and/or can otherwise function. The computing system can be local (e.g., to the display, to a computer connected to the display, display computing system, display processor, computer collocated with the display, etc.), remote (e.g., cloud, central computing system, server, etc.), and/or distributed (e.g., between a local and a remote computing system). The computing system is preferably in direct communication with the display and the user identification system, but can in indirect communication with the display and/or the user identification system, and/or in communication with any suitable components.

In a specific example, the computing system can be distributed between a display computing system 220 and a server 280. In this example, the display computing system can store the calibration parameters for the display, transmit the calibration parameters (and/or any suitable representation of the calibration parameters) to the server, format a 3D image in a display readable format (e.g., lenticularlize a 3D image), and/or can otherwise process or manipulate any suitable data. The server can function to register and/or generate authentication information for the display, format content in a shared format, process content, process a 3D image, and/or can otherwise function. However, the computing system can be distributed in any suitable manner.

The computing system can include one or more communication modules, calibration modules, authentication modules, shaders, renderers, and/or any suitable modules. The computing system can include any suitable processors (e.g., CPU, GPU, TPU, etc.), microprocessors, field programmable gate arrays (FPGA), memory, controllers, and/or other components.

The communication module functions to receive and transmit data (e.g., images, instructions, etc.) and/or metadata. The communication module can enable long-range and/or short range communication. In specific examples, the communication module can include cellular radios (e.g., broadband cellular network radios) such as radios operable to communicate using 3G, 4G, and/or 5G technology, Wi-Fi radios, Bluetooth (e.g., BLE) radios, Zigbee radios, Z-wave radios, Thread radios, wired communication modules (e.g., wired interfaces such as coaxial cables, USB interfaces, fiber optic, waveguides, etc.), and/or any other suitable communication subsystems. The communication module can be included in the camera computing system, the central computing system, and/or any suitable computing system.

The calibration module functions to store a set of calibration parameters 150 associated with the display. The calibration module can additionally or alternatively determine the set of calibration parameters from calibration data. The set of calibration parameters can include: alignment (e.g., relative alignment) between the pixel grid and the lenticular grid (or other parallax generator), slope 151, center 152, pitch 153, serial number, model number, firmware number, change in slope, change in center, change in pitch, viewcone inversion, and/or any suitable parameter. In some variants, the set of calibration parameters can include viewer properties such as interpupillary distance, back vertex distance, number of viewers, arrangement of viewers, relative pose between the viewer(s) and the display, and/or any suitable viewer properties. The set of calibration parameters can be stored in plaintext (e.g., cleartext) and/or as ciphertext (e.g., encrypted). For example, the set of calibration parameters can be represented by a checksum, a hash, and/or in any suitable format. The set of calibration parameters are preferably associated with a display (e.g., each display can be associated with a unique set of calibration parameters). However, the set of calibration parameters can be associated with any suitable identifying information (e.g., a user, a user entity, etc.). The set of calibration parameters can be stored in a look-up table, a matrix, as parameters (e.g., fit parameters associated with a fit to the calibration parameters), and/or in any suitable format. The set of calibration parameters can include and/or be associated with a serial number (e.g., a number that uniquely identifies the display).

In a specific example, a server can include a calibration module that includes a list of serial numbers (e.g., associated with a set of displays associated with a manufacturer, user, user entity, etc.) and associated calibration parameters. The calibration parameters can be represented by a checksum of the calibration parameters. In a related example, a display computing device can store the calibration parameters as encrypted values. The calibration module of the display computing device can decrypt the calibration parameters (e.g., using a public key, using a private key, using a symmetric key shared with the remote computing system and/or manufacturer, using a dynamic key, etc.). The calibration module can compute a checksum or other hash of the calibration parameters (e.g., encrypted calibration parameters, unencrypted calibration parameters, subset of the calibration parameters, etc.). However, the calibration module can store and/or process the calibration parameters in any suitable form.

The authentication module functions to authenticate the display. The authentication module can additionally or alternatively notify the user (and/or the user entity, device manufacturer, server owner, etc.) about the authentication attempt and/or results (e.g., authentication attempt made, authentication attempt succeeded, authentication attempt failed, etc.). The authentication module can authenticate the display by comparing the authentication information stored at the display with the authentication information stored (by the authentication module) in association with the display identifier, wherein the authentication module can store the authentication information for a plurality of displays. The authentication information can include: calibration parameters, checksums or hashes (e.g., of the respective calibration parameters), user identifiers, device identifiers, tokens (e.g., issued by the authentication module, by the manufacturer), signatures (e.g., wherein the authentication module verifies a message cryptographically signed with a cryptographic key associated with the calibration parameters), and/or other authentication information.

In a first variant, the authentication module can compare any suitable set or subset of the calibration parameters. In a second variant, the authentication module can compare a checksum (or other hash, encryption, conversion, etc. of one or more calibration parameters of the set of calibration parameters) of the calibration parameters, unprocessed (e.g., as measured, as determined) calibration parameters, encrypted calibration parameters, and/or any suitable calibration parameters.

The user identification system 300 functions to identify a user (e.g., viewer) and/or entity associated with the user. The user identification system can additionally or alternatively function to unlock the display and/or to tag the lightfield image with the user. The user identification system can be part of the display, part of the computing system, and/or can be an independent component. The user identification system can be coupled to and/or in communication with the display, the computing system, and/or any suitable component. In specific examples, the user identification system can include passwords, passcodes, personal identification numbers (PIN), near-field scanners (e.g., Bluetooth, keyfob, key card, RFID tag, etc.), biometric sensors (e.g., fingerprint, palm vein reader, palm print, facial recognition, hand geometry, iris recognition, retina recognition, voice, etc.), license (e.g., software license stored on a computer readable medium such as CD, USB, etc.), and/or any suitable user identification system).

The user interface can function to enable a user and/or viewer to interact with the three-dimensional image (and/or content used to generate the three-dimensional image). Examples of user interfaces include: touchbars, touch pads, noncontact sensors (e.g., cameras, image sensors, electric field sensors, optical sensors, etc.), mouse, keyboard, and/or any suitable user interface can be used.

4. Method

As shown in FIG. 4, the method can include receiving content, formatting the content as a three-dimensional image, determining calibration parameters, formatting the three-dimensional image to be display-readable, authenticating the display, displaying the three-dimensional image, and/or any suitable steps.

The method can function to determine calibration parameters for a display, authenticate a display, and/or use the display to display three-dimensional images. The system and method can function to verify that a device is authorized to use a software (e.g., that the device and software were produced by the same entity, that the device and/or software were produced by an approved entity, etc.), verify that a user is an authorized user, format content as a three-dimensional image, display three-dimensional images of a scene (e.g., based on calibration parameters), and/or can otherwise function.

The method and/or any steps or substeps of the method can be performed once (e.g., during manufacturing, after manufacturing, at the first start-up of the display, etc.) or more than once (e.g., periodically, on a calibration schedule, according to an authentication schedule, randomly, when a network connection meets a threshold quality, every time the display is operated, a subset of times that the display is used, etc.). The method and/or any steps or substeps of the method can be performed automatically, responsive to a trigger (e.g., a call for calibration parameter transmission, a call for display authentication, a call to display a three-dimensional image, etc.), and/or manually.

The method and/or steps thereof are preferably implemented in a software. However, one or more steps of the method can be implemented using hardware (e.g., in an integrated circuit, SoC, FPGA, etc. configured to perform the steps). The method and/or steps thereof are preferably performed within a single program (e.g., executable, application, etc.), but can be distributed between more than one program. Data and/or information used by the method and/or steps thereof can be accessed from and/or the method and/or steps thereof can be implemented using an application program interface (API), a user interface, an external system interface, a callback (e.g., a webhook, a programmatic callback, etc.), a communication session, an application (e.g., a web application), a dashboard, and/or any suitable interface can be used. The method and/or steps thereof can be distributed between a plurality of computing systems and/or processors, be performed on a single processor (e.g., a processor or computing system collocated with the display which can be particularly beneficial for high resolution content such as 4 k or 8K 3D images; on a server, which can be particularly beneficial for reducing a computing power available at the display; etc.), and/or on any suitable computing systems and/or processors.

The method is preferably performed by a system (e.g., as described above), but can be performed by any suitable system (e.g., a system configured to perform the method).

Receiving content S100 functions to acquire, access, and/or otherwise receive content from a user, sharer, interface (e.g., web interface, archive, file, folder, etc.), and/or other endpoint. The content 400 can be received as two-dimensional content, three-dimensional content (e.g., three spatial dimensions, two spatial dimensions and a temporal dimension such as a 2D video, etc.), four-dimensional content (e.g., a holographic video), and/or with any suitable dimensionality. The content can include: images (e.g., still images, frames of videos, screenshots, pictures, photographs, digital images, analog images, portrait mode photos, three-dimensional images, lightfields, quilt images, etc.), videos, models (e.g., computer generated models, CAD models, etc.), computer generated graphics (e.g., vector graphics, mesh, etc.), depth images (e.g., RGBD images, stereoscopic images, one or more images and depth sensor data associated with said images, etc.), and/or any suitable content. For example, content can be received in any graphics format (examples include but are not limited to content with file extensions such as jpg, png, tiff, bmp, gif, svg, ebm, mov, yuv, amv, mp4, mpg, step, proprietary formats, open formats, etc.). However, the content can be restricted to specific file formats (e.g., to minimize security risks from unknown formats, formats that include metadata for how to parse the format, etc.). The content can be received by a remote computing system, a local computing system (e.g., local to a display), one or more image sensors, and/or by any suitable computing system. In some variants, receiving the content can include acquiring a plurality of images of a scene (e.g., using a camera array, using a camera that traverses the scene, using a camera that is repositionable relative to the scene, acquiring a time series of images, in a manner as disclosed in U.S. patent application Ser. No. 17/575,427 titled 'SYSTEM AND METHOD FOR LIGHTFIELD CAPTURE' filed 13 Jan. 2022 incorporated in its entirety by this reference, etc.).

Formatting the content as a three-dimensional image S200 preferably functions to convert the content into a three-dimensional image 500 (e.g., an image with three spatial dimensions, a frame of a three-dimensional video, etc.). S200 can additionally or alternatively function to transform the content from one standard to another (e.g., change a format of the content), and/or can otherwise function. For instance, when the content is received as a photoset (e.g., a plurality of separate image files), the photoset can be formatted as a quilt image (e.g., a single container that includes each of the plurality of images in a predetermined arrangement such as a raster arrangement; boustrophedonic arrangement; zigzag arrangement; space filling arrangement such as Hilbert curve, an onion curve, Morton curve, Moore curve, Peano curve, Gosper curve, etc.; etc.), a depth image, a depth quilt, and/or in any suitable format. The three-dimensional image format is preferably a compressible format (e.g., can be compressed into a representation such as those disclosed in U.S. patent application Ser. No. 17/226,404 titled 'SYSTEM AND METHOD FOR GENERATING LIGHT FIELD IMAGES' filed 9 Apr. 2021 incorporated in its entirety by this reference), but can be a non-compressible format.

Formatting the content as a three-dimensional image preferably includes associating information with the three-dimensional image that can be used to recreate, display, read, and/or otherwise process the three-dimensional image. For instance, metadata can be associated with the three-dimensional image to indicate a raster direction, a number of views within the three-dimensional image, a view arrangement, a shader or shader properties to generate the three-dimensional image, and/or any suitable information. However, the information can be transmitted as a separate file, can be excluded, and/or can be included in any manner.

Formatting the content as a three-dimensional image can optionally include compressing the three-dimensional image which can decrease a data size and/or bandwidth needed to transmit the three-dimensional image. In a specific example, the three-dimensional image can be compressed as disclosed in U.S. patent application Ser. No. 17/226,404 titled 'SYSTEM AND METHOD FOR GENERATING LIGHT FIELD IMAGES' filed 9 Apr. 2021 incorporated in its entirety by this reference. However, the three-dimensional image can be compressed using any suitable video and/or image compression techniques and/or using any suitable techniques.

In a first illustrative example, when the content includes a photoset, formatting the content as a three-dimensional image can include: determining a perspective of each image of the photoset, arranging the photoset in an order based on the perspective (e.g., from a first extreme perspective to a second extreme perspective), and storing the images of the photoset as a quilt image.

In a second illustrative example, when the content includes a photoset, formatting the content as a three-dimensional image can include: determining a depth to features of the images between a pair of images of the photoset (e.g., using stereovision techniques such as FAST, BRISK, SURF, SIFT, etc. to determine correspondences and computing depth based on a camera baseline and/or pose) and generating a depth image from the depth map and an image of the photoset (e.g., by storing the depth information in an alpha channel of the image). In variations of the second illustrative example, a depth quilt can be formed by generating a plurality of depth images from the photoset (e.g., using different pairs of images from the photoset) and arranging the depth images in a quilt image.

Figure 10:
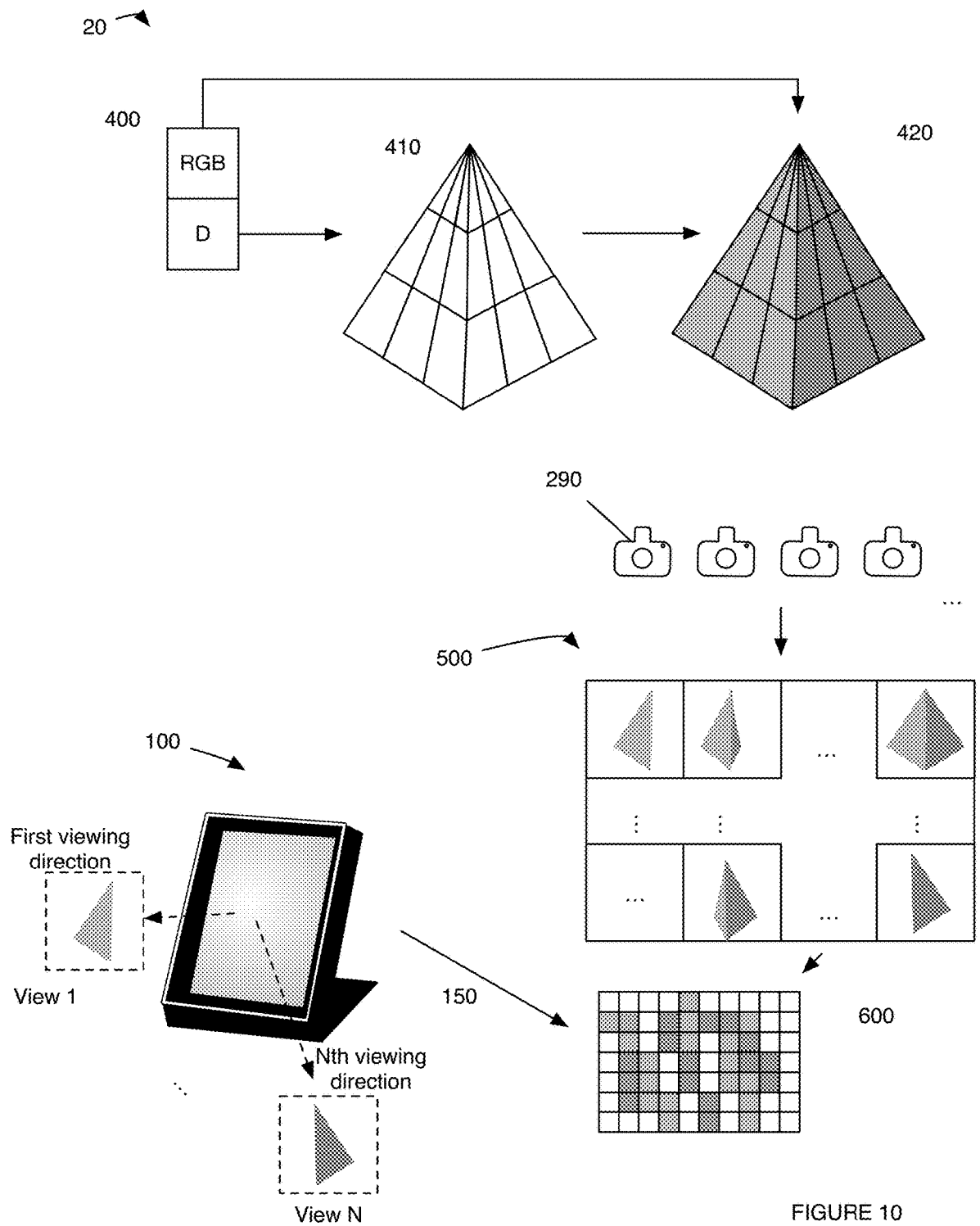
FIG. 10 is a schematic representation of an example of the method.

In a third illustrative example, as shown for instance in FIG. 10, formatting content as a three-dimensional image can include: receiving a depth image, using the depth information to generate a 3D mesh 410, applying a texture to the 3D mesh based on the color information from the depth image, using a renderer to generate a plurality of views of the textured 3D mesh 420 (e.g., virtual cameras 290 from a plurality of positions, a processor solving the rendering equation from a plurality of perspectives or positions relative to the 3D mesh, etc.), and arranging the plurality of views as a quilt image.

In a fourth illustrative example, a plurality of formats can be formed for content. For instance, the same content can be formatted as a quilt image 550 (e.g., according to the first and/or third examples), a depth image (e.g., according to the second example), a depth quilt (e.g., according to the variation of the second example), and/or in any suitable formats.

However, the content can otherwise be formatted.

In some variants of S200, formatting the content as a three-dimensional image can include formatting the content based on sensor data. For example, tracking information (e.g., eye tracking, gaze tracking, head tracking, etc.) can be used to determine viewers' positions, where the viewers' positions (e.g., eye positions) can be used to determine a viewing direction for rendering. However, the content can additionally or alternatively be formatted based on an ambient lighting, color (e.g., color balance), gamma correction, and/or any suitable display, environmental, viewer, and/or content properties.

In some variants of S200, formatting the content as a three-dimensional image can include modifying (e.g., changing, setting, etc.) a property of the three-dimensional image. Examples of properties include depthiness (e.g., how 3D the three-dimensional image is), focal plane, zero-parallax point, zoom, pan, set a parallax scale, and/or otherwise adjusting properties of the three-dimensional image. For example, the focal plane, zero-parallax point, zoom, pan, parallax scale, and/or other properties can be adjusted as described in U.S. patent application Ser. No. 17/539,954 titled "SYSTEM AND METHOD FOR PROCESSING THREE DIMENSIONAL IMAGES" filed 1 Dec. 2021 incorporated in its entirety by this reference. In another example, a focal plane can be adjusted by changing (e.g., setting) a zero or near zero disparity point between views to a common location in the views. In another example, depthiness can be adjusted by changing (e.g., scaling, transforming, etc.) a depth map associated with a depth image (and/or depth frame of a depth video). However, the three-dimensional image can otherwise be adjusted.

Determining calibration parameters S300 functions to determine calibration parameters (e.g., calibration parameters as described above) associated with the display. The calibration parameters are preferably invariant (e.g., do not change from when the display is manufactured, shipped, etc.), but can change (for example in response to mechanical shock, pressure, temperature, humidity, light, etc.). The display is preferably calibrated once (e.g., during manufacturing, after manufacture, before shipping, after shipping, etc.), but can be calibrated more than once (e.g., periodically, according to a calibration schedule, as needed, etc.). The display is preferably calibrated by a display manufacturer, but can be calibrated by a user, a technician, and/or by any suitable individual and/or entity. S300 can be performed by a display, a computing system (e.g., a display computing system, a server, etc.), and/or by any suitable component.

Determining calibration parameters can include: measuring the calibration parameters; examining the display (and/or display components such as the light source, optical elements, pixels, liquid crystals, parallax generator, etc.) using a sensor (e.g., an optical sensor such as a microscope, an interferometer, etc.; an acoustic sensor such as ultrasound; a mechanical sensor such as a probe; etc.), and determine the calibration parameters using the sensor data (e.g., computer vision, fit to the sensor data, etc.); displaying a calibration image using the display and modifying the calibration parameters until the calibration image achieves a target specification; modelling (e.g., using optical modelling) the display and determining calibration parameters based on the model; retrieving calibration parameters (e.g., from memory, from a display computing system, from a server, etc.), and/or any suitable steps.

In a specific example, a calibration image can include a calibration pattern. The calibration pattern can include a bullseye, a set of parallel lines, a set of perpendicular lines, a set of intersecting lines (e.g., with known intersection angle(s)), tiling of a shape, a checkerboard pattern, and/or any suitable pattern. In this specific example, the target specification can include parallelism (e.g., of two or more lines that are supposed to be parallel), shift (e.g., how far is a reference such as a reference point, reference line, reference shape, reference surface, etc. of the calibration image shifted from a reference of the display such as the center of the display, an edge of the display, a corner of the display, etc.), sharpness (e.g., minimize edge thickness for features), blur, image continuity (e.g., threshold number of adjacent pixels in the image are adjacent in the displayed image), and/or any suitable specifications. However, any suitable target specification (e.g., based on the calibration image, subjective quality, objective quality, etc.) and/or calibration image can be used.

S300 can include storing the calibration parameters. The calibration parameters are preferably stored at a display computing system and/or a server, but can be stored at any suitable computing system(s). The calibration parameters can be stored in volatile or non-volatile memory. The calibration parameters are preferably stored to read-only memory (ROM) such as Mask ROM, programmable read-only memory (PROOM), erasable programmable read-only memory (EPROM), electrically erasable programmable memory (EEPROM), flash memory, and/or any suitable ROM. However, the calibration parameters can be stored to random access memory (RAM), and/or any suitable memory.

The calibration parameters can be stored raw (e.g., as measured, as determined) and/or processed. The calibration parameters are preferably processed according to a processing function, but can be processed using artificial intelligence, equations, and/or using any suitable conversion. The calibration parameters can be processed in one or more different ways. For example, the calibration parameters can be processed using one or more encoding keys (e.g., hashing keys, encryption keys, etc.), using one or more encoding process (e.g., encryption, hashing, etc.), and/or the calibration parameters can otherwise be processed (e.g., where each process can be performed in series and/or parallel, where each process can be stored, etc.).

Processing the calibration parameters can include encoding the calibration parameters. The calibration parameters can be encoded in a retrievable manner (e.g., encrypted) and/or an unretrievable manner (e.g., fingerprint, hashing, etc.).

In a first variation, processing the calibration parameters can include encrypting the calibration parameters. For instance, the calibration parameters can be encrypted using symmetric or asymmetric encryption. In the former embodiment, the symmetric key can be shared between: the manufacturer and the device, the device and the server, the device and the user, the user and the server, and optionally shared with the authentication module. The same and/or different symmetric key can be used for different devices. In the latter embodiment, the calibration parameters can be encrypted with the private key of the asymmetric keypair, and the corresponding public key can be loaded onto the device (e.g., by the manufacturer). Examples of encryption algorithms that can be used include: data encryption standard (DES), triple DES (3DES), Blowfish, Twofish, advance encryption standard (AES), international data encryption algorithm (IDEA), Rivest-Shamir-Adleman (RSA), Diffie-Hellman, elliptic curve cryptography (ECC), and/or other symmetric or asymmetric algorithms.

Figure 8A:
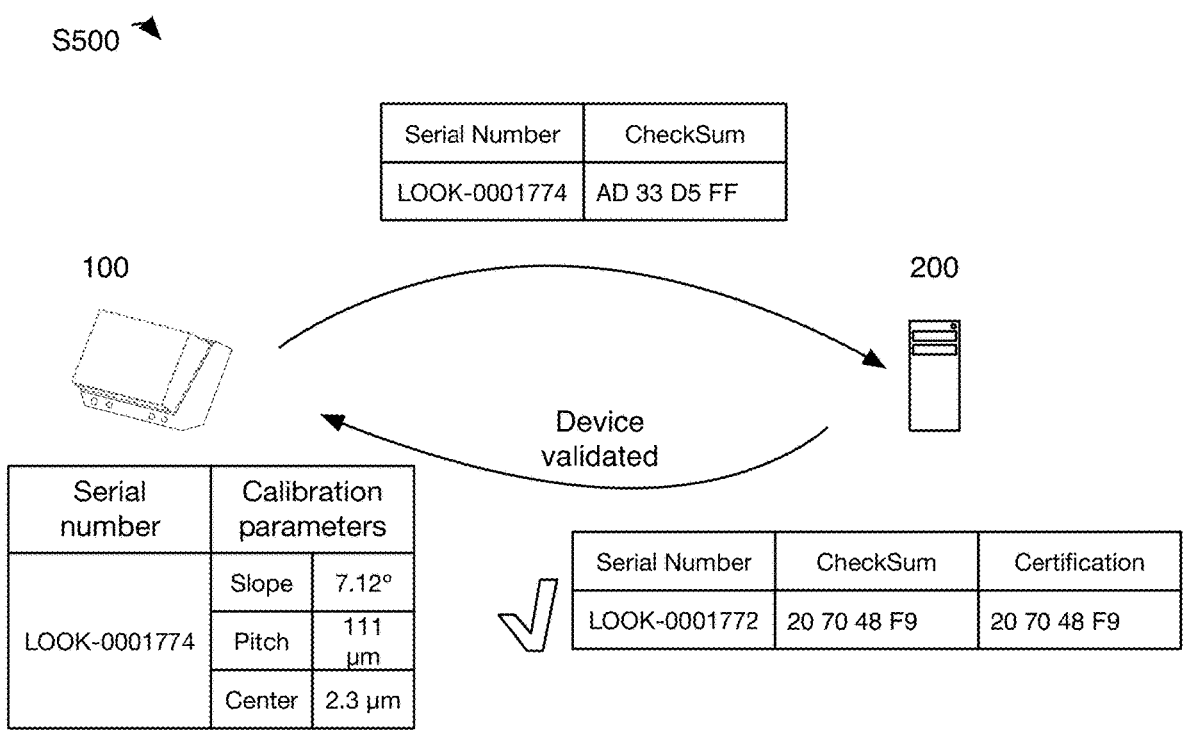
FIGS. 8A and 8B are schematic representations of examples of authenticating a display.
Figure 8B:
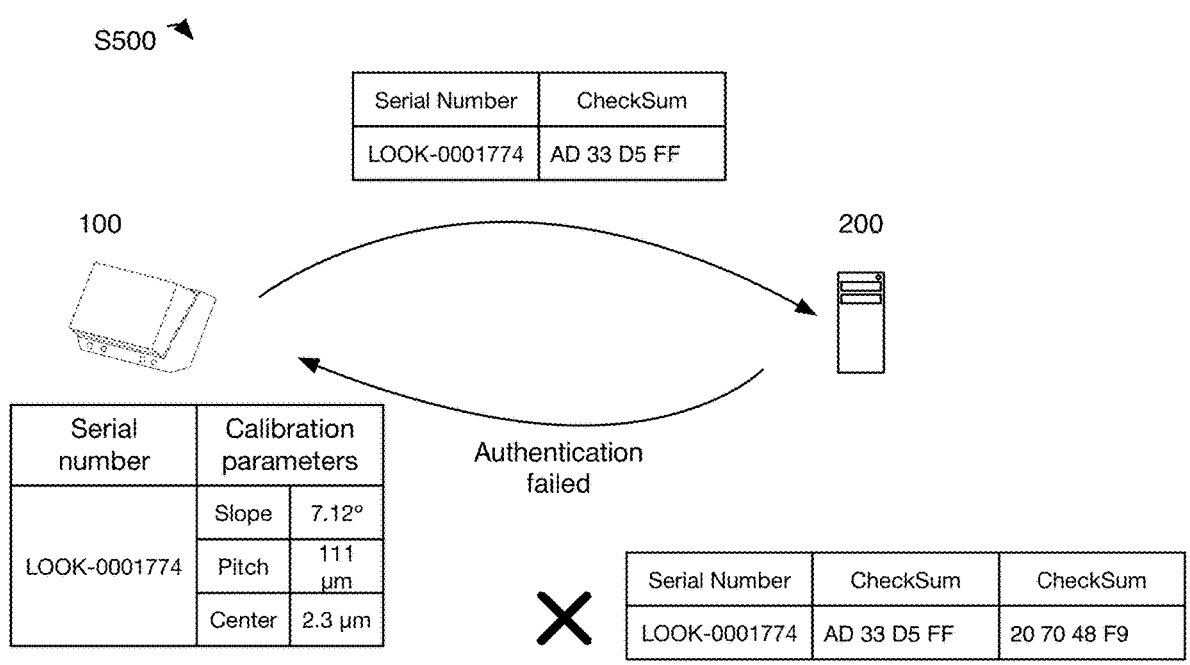

In a second variation, processing the calibration parameters can include hashing the calibration parameters, which functions to enable calibration parameter verification. The hash can be determined before display use, before initial display use, periodically, or at any other suitable time (e.g., when a device is connected to the internet, when the device is not actively being used, etc.). The hash (for each display) can be stored by the authentication module (e.g., at a server, on a device computing system, etc.) in association with the respective device identifier (example shown in FIGS. 8A and 8B, serial number), but can be otherwise used. The hash input can be: the calibration parameters, the encrypted calibration parameters (e.g., when a deterministic encryption algorithm is used), the device identifier, a hashing key (e.g., a validated key, an unvalidated key, an authenticated key, an unauthenticated key, a public key, a private key, a first key, second key, third key, etc.), and/or any other suitable data. Examples of hash functions that can be used include: secure hash algorithm (SHA), cryptographic hash functions, Hash-based message authentication code (HMAC), Fletcher's checksum, cyclic redundancy checks (CRC) such as CRC32, Adler-32, longitudinal parity check, sum complement, fuzzy checksums, a fingerprint function, a randomization function, and/or any suitable hash function. In a specific example of the second variation, display calibration parameters (e.g., one or more of a lenticular slope, lenticular center, lenticular pitch, gradient in lenticular slope, gradient in lenticular center, gradient in lenticular pitch, etc.) can be converted into a checksum. In a variant of this specific example, the display calibration parameters and an encoding key (e.g., hashing key) can be converted into a checksum. However, the display calibration parameters can be converted into any suitable hash.

However, the set of calibration parameters can otherwise be encoded.

The processing function can operate on all calibration parameters and/or a subset of calibration parameters. The processing function can optionally append data and/or metadata to the calibration parameters. The appended metadata can include what type of function was used to store the calibration parameters.

However, the calibration parameters can be represented in any suitable format.

S300 can optionally include determining calibration parameters format, transmitting the calibration parameters, and/or any suitable steps.

Determining the calibration parameter format S320 can function to determine whether the calibration parameters stored on the display are encrypted, and/or determines the format of the calibration parameters stored on the display.

Determining the calibration parameter format can include: determining a randomness value for the calibration parameter, attempting to decrypt the calibration parameter (e.g., using a public key, using a private key), determining a byte encoding (e.g., hex, base64, Ascii85, etc.), determining whether a padding is correct (e.g., a padding provided to an encryption algorithm), checking the metadata of the calibration parameters (e.g., for a format identifier such as 'encrypted', for the absence of a format identifier, etc.), and/or any suitable steps.

Transmitting the calibration parameters S330 functions to transmit the calibration parameters to a receiver. The receiver can function to store the calibration parameters (e.g., to back-up the calibration parameters), authenticate the calibration parameters, generate a certification, and/or otherwise function. The receiver is preferably a remote computing system (e.g., the server), but can be any suitable computing system. S330 can be performed before, during, and/or after S320. The calibration parameters can be transmitted as raw values and/or processed values. S330 is preferably performed by a display computing system (e.g., a communication module of a display computing system), but can be performed by a remote computing system and/or any suitable component.

In variants, when the calibration parameters are encrypted (e.g., as determined in S320), S330 can include decrypting the calibration parameters (e.g., before transmitting the calibration parameters). The calibration parameters can be decrypted using a public key and/or a private key (e.g., depending on the encryption algorithm used). The key can be stored on the display computing system, determined by the display, provided by the server, stored on the server, and/or otherwise accessed.

In a second variant, the calibration parameters can be retrieved from the display computing system (e.g., display calibration parameters), processed using a hashing function (e.g., the server hashing function, a different hashing function, etc.), and the processed display calibration parameters can be transmitted to the server. In variations of the second variant, the hashing function can include a checksum function, where the checksum can be used for authentication, for verifying data integrity, and/or can otherwise be used.

However, the calibration parameters can be transmitted in any suitable format.

Formatting the three-dimensional image to be display-readable S400 preferably functions to convert the three-dimensional image (e.g., from S200) and/or the content (e.g., from S100 such as when the content is provided in a compatible format) into a format 600 that is compatible with the display (e.g., can be displayed by the display and perceived as three-dimensional by one or more viewers). S400 is preferably performed after S200, but can be performed before and/or during S200 (e.g., when the three-dimensional image is display readable). S400 can be performed before, during, and/or after S300 or S500. S400 is preferably performed by a local computing system (e.g., a display computing system), but can be performed by a remote computing system (e.g., a server, cloud computing system, etc.) and/or any suitable component. S400 is typically performed locally (e.g., at a display computing system) as the display readable formats can be difficult to compress (e.g., without introducing compression artifacts, by an appreciable amount, etc.). However, S400 can be performed remotely (e.g., to leverage the greater processing bandwidth that may be available in a remote computing system) and/or distributed in any manner.

Examples of display-readable formats 600 include: lenticularlized images 650 (e.g., where the views are aligned to the subpixels such that views are transmitted into free space in a predetermined order from a first extreme perspective to an opposing extreme perspective), stereoimages, movable images (e.g., 'wiggle gif'), images that depend on a dead reckoning or positioning of a display (e.g., images where the displayed image depends on a readout from a sensor, gyro-responsive light fields, etc.), tracking (e.g., eye-tracking, gaze tracking, head tracking, etc.) responsive images, and/or any suitable format.

The three-dimensional image (and/or content) is preferably converted to the display-readable format based on the display calibration parameters. However, the three-dimensional image (and/or content) can be converted to a display-readable format independent of the display calibration parameters and/or using any suitable information. For instance, a three-dimensional image can be lenticularized based on the display calibration parameters (e.g., views can be aligned to, associated with, etc. subpixels of the display based on a target viewing angle for each view and a direction that light emitted from the subpixels will be directed as determined from the display calibration parameters). When the display calibration parameters are incorrect or inaccessible (e.g., for a non-authenticated display), the resulting lenticularized image will typically not display correctly. In another example, a three-dimensional image can be aligned to a horizontal and/or vertical position based on an alignment of the display to the viewer(s) and/or based on viewer properties (e.g., interpupillary distance, back vertex distance, etc.). In another example, two (or more) views from the three-dimensional image can be selected to be displayed (e.g., views associated with an eye, gaze, head, etc. position of the viewer(s)). However, the three-dimensional image can otherwise be formatted to be display readable.

Authenticating the display S500 functions to ensure that an authorized user (and/or entity) is using the display, to ensure that a software development kit is being used with authorized hardware, ensure that the correct software (e.g., software version) is being used with the display, and/or otherwise authenticate the software and/or display. S500 is preferably performed after S300, but can be performed at the same time as S300. S500 is preferably performed by an authentication module (e.g., of the computing system, of the server, of the display computing system, etc.), but can be performed by any suitable component. The display is preferably authenticated based on an authentication identifier. The display can be authenticated for any display, when the display is associated with (e.g., includes, requires, etc.) calibration parameters to operate, when a display is suspected of being fraudulent (e.g., based on an activity log, based on database query behavior, etc.), when a threshold number of three-dimensional images have been displayed, when a threshold number of three-dimensional images have been generated, when the display is a lenticular display, when the display includes a parallax generator, when the display presents greater than a threshold number (e.g., >2, >4, >10, >20, >40, >100, etc.) of images or views contemporaneously (e.g., concurrently, simultaneously, etc.), when the display includes one or more sensors that require calibration (e.g., alignment), when a display requires an alignment to viewer(s) (e.g., to provide an optimal, preferred, etc. viewing experience), and/or for any suitable display(s).

S500 preferably includes comparing the display calibration parameters (e.g., processed display calibration parameters, etc.) to the certification (e.g., stored calibration parameters; calibration parameters, associated with the display, generated by the server and stored at the display computing system; etc.). However, S500 can compare the calibration parameters stored on the display to the server calibration parameters, and/or to any calibration parameters. This comparison is preferably performed on processed calibration parameters (e.g., hashed calibration parameters, encrypted calibration parameters, calibration parameters in a checksum representation, calibration parameters as processed in S300, etc.). However, the comparison can be between raw calibration parameters, a subset of the calibration parameters (e.g., that may have been processed such as to form a hash, encryption, etc. for the subset of calibration parameters such as using one, two, three, five, ten, values therebetween, greater than ten, etc. calibration parameters), and/or any suitable representation of the calibration parameters.

The display is preferably authenticated when the calibration parameters match the certification (e.g., are exactly the same, a computed distance such as a hamming distance between the calibration parameters and the certification is 0, etc.). However, the display can be authenticated in response to any suitable output from the comparison.

Figure 5A:
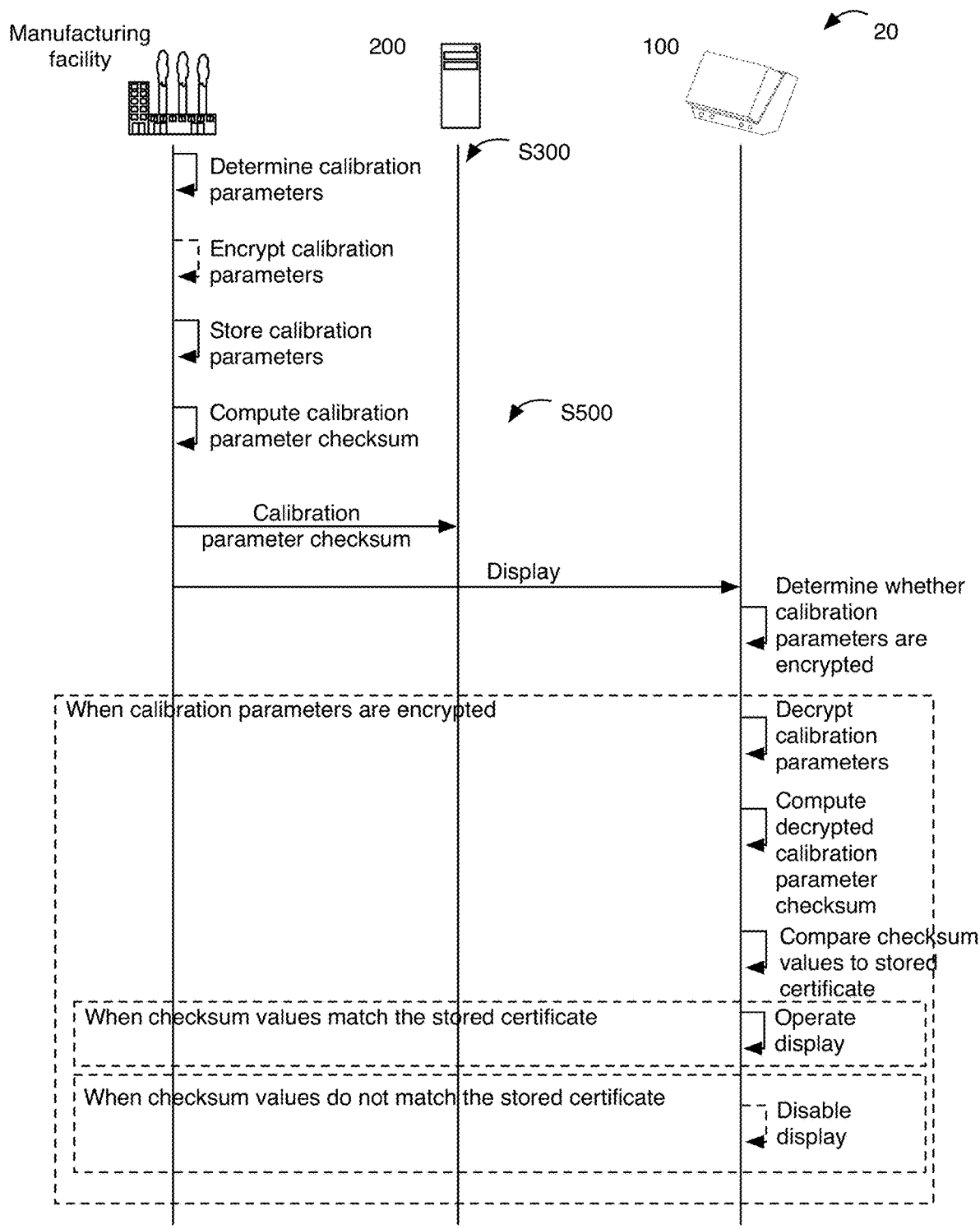
FIGS. 5A and 5B are schematic representations of variants of the method.
Figure 5B:
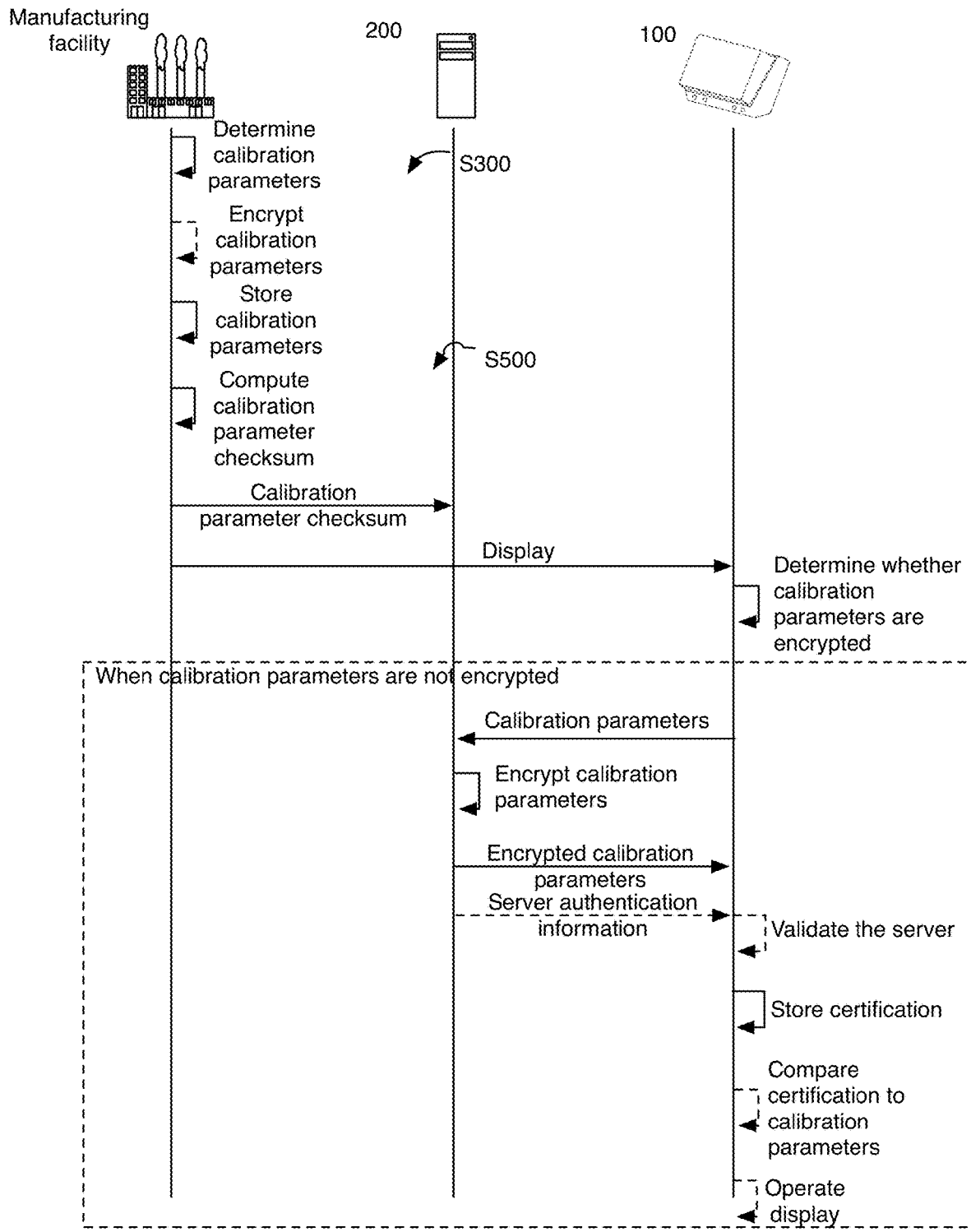

In variants, as shown in FIG. 5B (such as when the display calibration parameters are not encrypted, hashed, or otherwise processed), the display can be authenticated automatically when the server receives: an authentication request (e.g., from the display computing system), display calibration parameters, and/or any suitable data. However, the display can be authenticated depending on a time window during which the server receives data (such as the authentication request, the display calibration parameters, etc.), not be authenticated, and/or receive any suitable authentication.

When the display is authenticated, as shown in FIG. 5A, S500 can include transmitting an authentication notification (e.g., to the user, to the entity, to the display, etc.), activating the display (e.g., enabling power to the light sources and/or any suitable components of the display to enable the display to operate, establishing a communicable link between the computing system and the display, etc.), providing the set of calibration parameters and/or a subset thereof (e.g., parallax generator arrangement, parallax generator alignment relative to the pixels or subpixels of the display, etc.) to the computing system (e.g., to facilitate performance of S400) such as by enabling access to the calibration parameters (e.g., providing a key to decrypt the calibration parameters, providing a passcode to access the calibration parameters, exposing the calibration parameters, etc.), and/or any suitable response.

Figure 7:
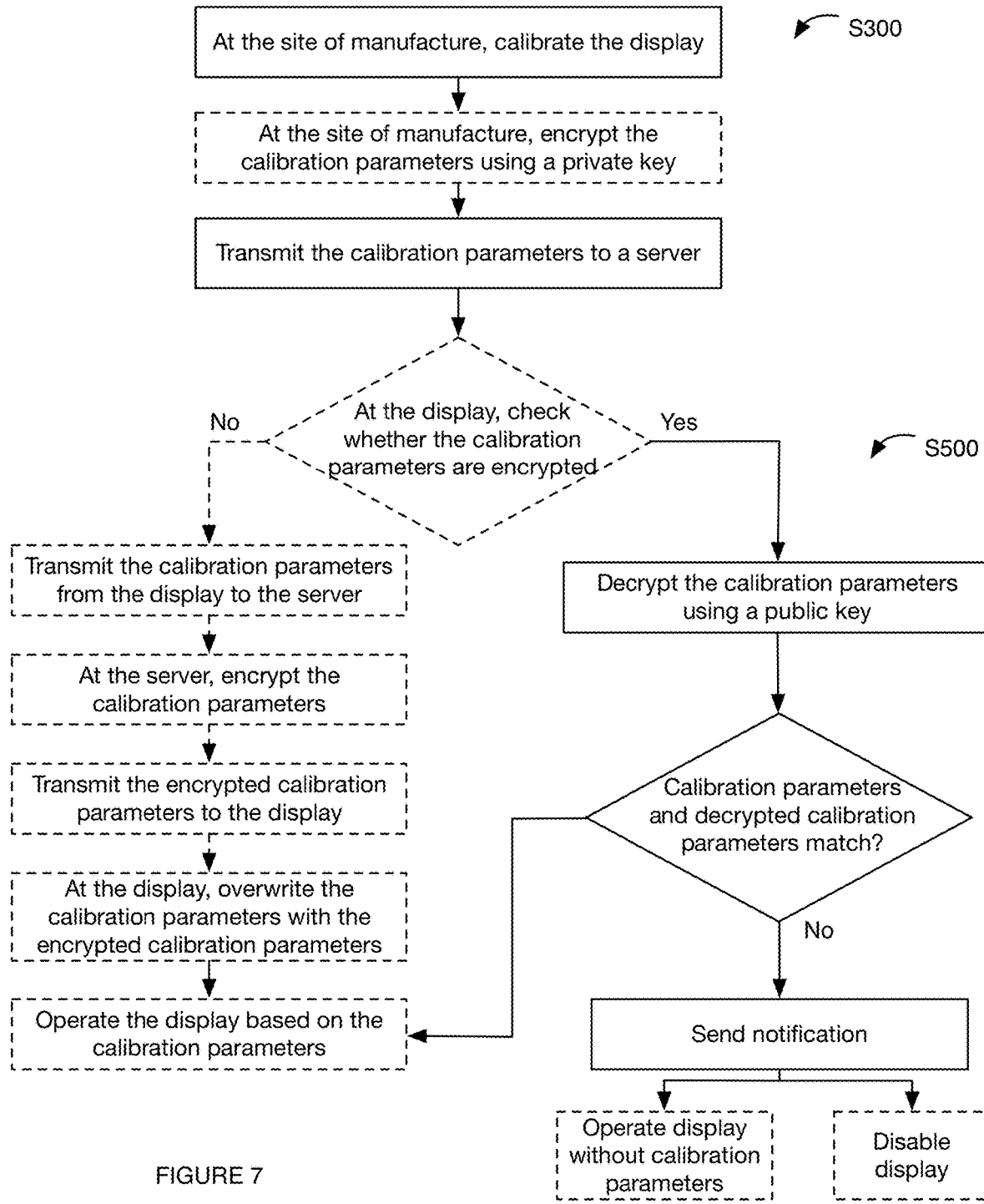
FIG. 7 is a schematic representation of an example of the method.

When the display is not authenticated, for example as shown in FIG. 7, S500 can include transmitting a failed authentication notification (e.g., to the user, to the entity, to the owner, to the manufacturer, etc.), deactivating the display (e.g., disabling power to the display and/or display components, disabling a communicable link between the display and the computing system, etc.), resetting the calibration parameters, deleting the calibration parameters (e.g., at the display, at the server, etc.), determining whether the display has been recalibrated, providing incorrect calibration parameters, and/or any suitable steps.

S500 can optionally include generating an authentication identifier (e.g., a certification) S550, which functions to generate an authentication identifier for the device when the device is not associated with an authentication identifier and/or to enable offline device authentication. S550 can be performed by an authentication module of the computing system, by a server, and/or by any suitable component.

In a specific example, S550 can include: at the server, encrypting the calibration parameters (e.g., received from the display), optionally storing the calibration parameters (e.g., when the server did not have calibration parameters associated with the display, updating the server calibration parameters, etc.), and transmitting the processed (e.g., encrypted, hashed, checksum etc.) calibration parameters to the display. Storing the processed calibration parameters at the display can function to standardize the authentication process for different displays. The display can store the encrypted calibration parameters (e.g., overwriting the previously stored calibration parameters, in addition to the previously stored calibration parameters, etc.) and/or any suitable authentication information. The encrypted calibration parameters can be stored: automatically (e.g., without an additional server authentication process) or after the message with the encrypted calibration parameters is validated (e.g., authenticated as received from a trusted source, such as the server). Validating the encrypted calibration parameter message can include: verifying a server signature (e.g., wherein the message is signed with the server's private key, wherein the device stores the public key and/or receives the public key from a trusted source), verifying a device token (e.g., issued by the device to the server), verifying a shared secret (e.g., decrypting the encrypted calibration parameter message with a shared symmetric key), verifying a server certificate, and/or other validation processes.

In some variants, S500 can include authenticating a viewer and/or user. These variants can be beneficial, for instance, to ensure that an authenticated user and/or viewer is interacting with the content (particularly, but not exclusively, with sensitive or confidential information such as trade secrets, medical files, medical information, etc.). The viewer and/or user can be authenticated, for example, based on an input from the viewer and/or user at the user identification system (e.g., badging on, signing on to an account, entering a PIN, entering a passcode, entering log-in information, using a biometric marker to identify a viewer and/or user, etc.). However, the viewer and/or user can otherwise be authenticated.

Operating the display Shoo functions to display a three-dimensional image. S600 can be performed before, during, and/or after S500 or S400. S600 is preferably performed by the display, but can be performed by the computing system and/or any suitable component. S600 is preferably performed only for an authenticated display (e.g., a display that has been authenticated at least once), but can be performed for an unauthenticated display (e.g., where the three-dimensional image can appear garbled, where the three-dimensional image can be properly presented until a threshold time, etc.). When S600 is performed for an unauthenticated display (and/or a display that does not have the correct calibration parameters such as determined in S300), the views corresponding to the three-dimensional image can appear distorted, confusing, inaccurate, garbled, and/or otherwise appear unusual. However, the three-dimensional image can appear correct for an unauthenticated display (e.g., prior to a black-out date, rollout date, etc.; when the display is not able to communicate with a server, etc.). The display is preferably operated according to a set of operation parameters.

S600 can include operating the light source, optical elements, parallax generator, and/or any suitable components of the display. The display and/or display components operation can be modified based on the calibration parameters to show the corrected views (e.g., views such that the three-dimensional image would appear the same regardless of display), the views can be corrected based on the calibration parameters to show the correct views, and/or the three-dimensional image can be corrected in any suitable manner.

Operating the display can optionally include identifying the user (e.g., using the user identification system), appending data and/or metadata to the three-dimensional images, generating a log-of-use dataset (e.g., including who used the display, when the display was used, the duration of use, image(s) displayed, etc.) associated with the display, storing the user identity (e.g., at the display, at the server, etc.), and/or any suitable steps.

5. Specific Examples

Figure 9:
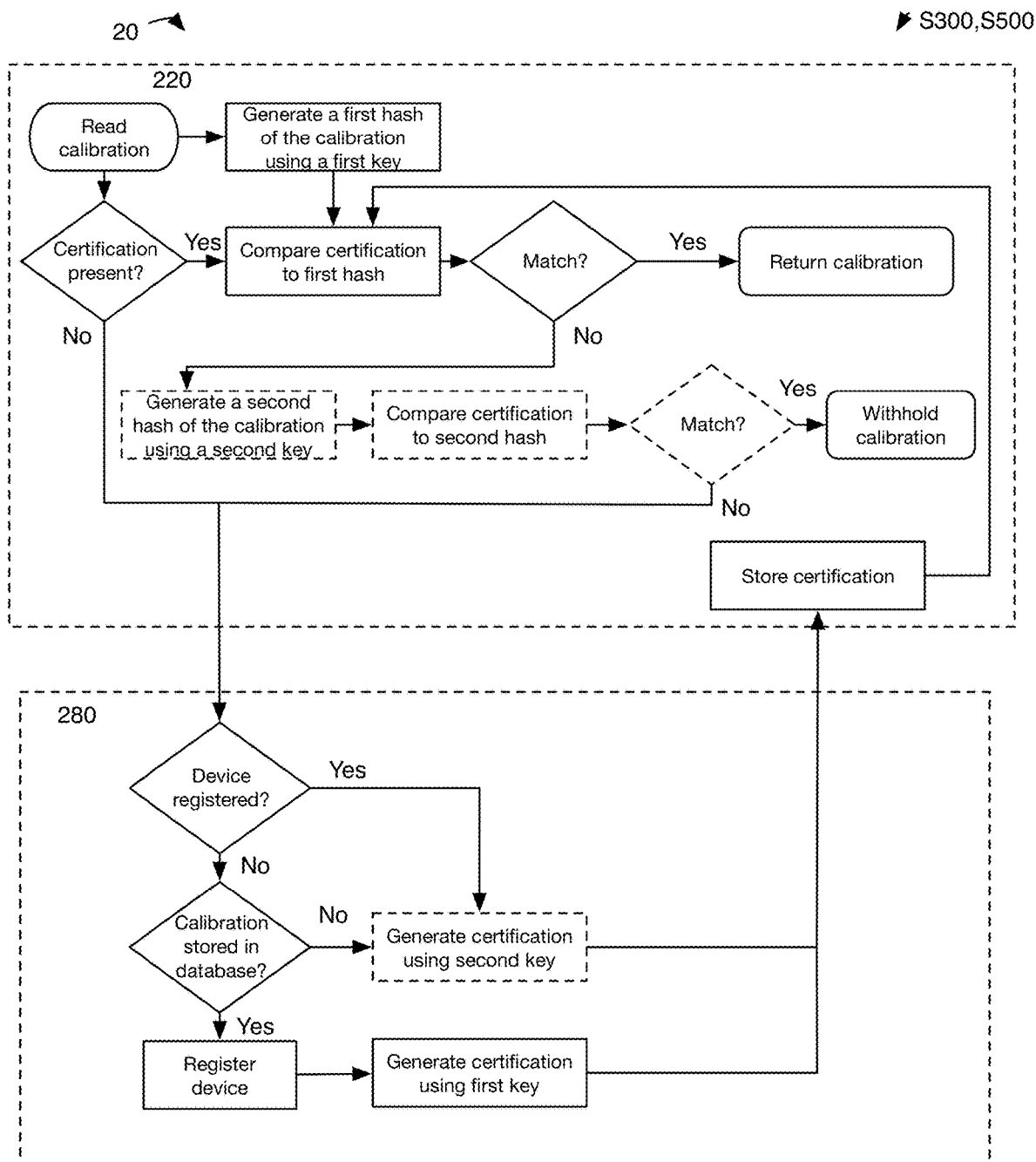
FIG. 9 is a schematic representation of an example of the method.

In a specific example, as shown in FIG. 9, the method can include: at a display computing system: determining the display calibration; generating a first hash of the display calibration using a first key; comparing the first hash to a certification stored on the device computing system; when the first hash and the certification match: returning the display calibration and operating the display based on the display calibration. In this specific example, when the first hash and the certification do not match the method can include: generating a second hash of the calibration using a second key, comparing the second hash to the certification, and withholding the calibration when the second hash matches the certification. In this specific example, when the certification is not stored on the display computing system and/or when the second hash and the certification do not match the method can include, at a server: determining whether the display is registered, determining whether the calibration for the particular display is stored in the database, when the device is not registered: registering the device, generating the certification using the first key, and storing the certification at the display computing system. In this specific example, when the device is registered and/or a calibration associated with the display is not stored at the server, the method can include generating the certification using the second key and storing the certification at the display computing system.

Figure 11A:
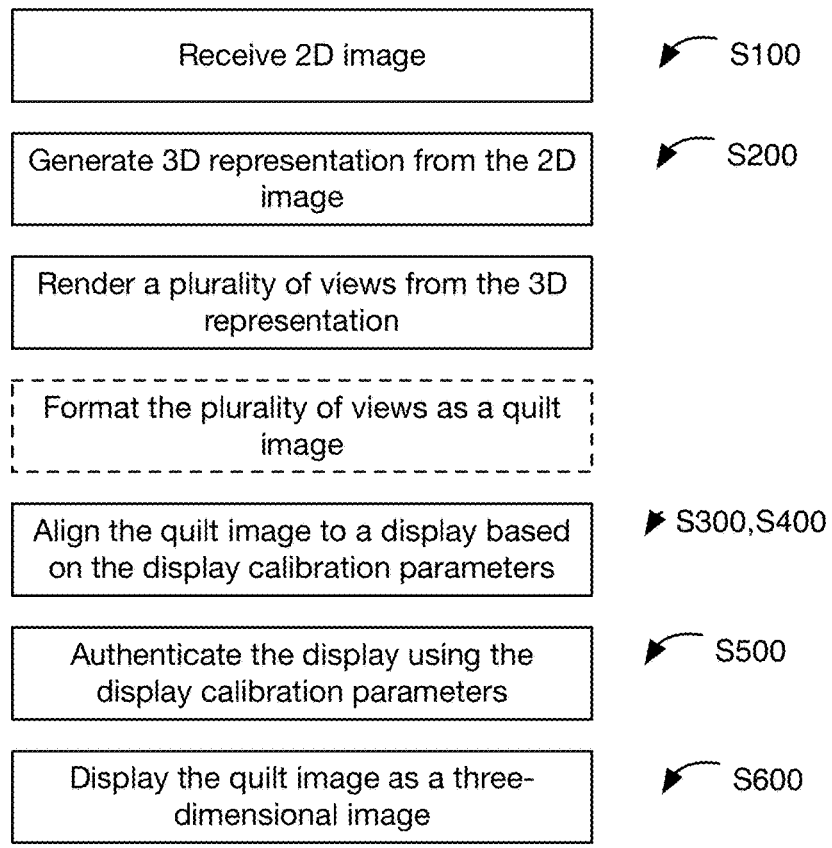
FIGS. 11A and 11B are schematic representations of variants of the method.

In a second specific example, as shown in FIG. 11A, the method can include: receiving a 2D image, generating a 3D representation from the 2D image, rendering a plurality of views from the 3D representation, optionally formatting the plurality of views as a quilt image, aligning the quilt image to a display based on the display calibration parameters, optionally authenticating the display using the display calibration parameters (e.g., compared to a stored calibration parameter), and displaying a three dimensional image.

Figure 11B:
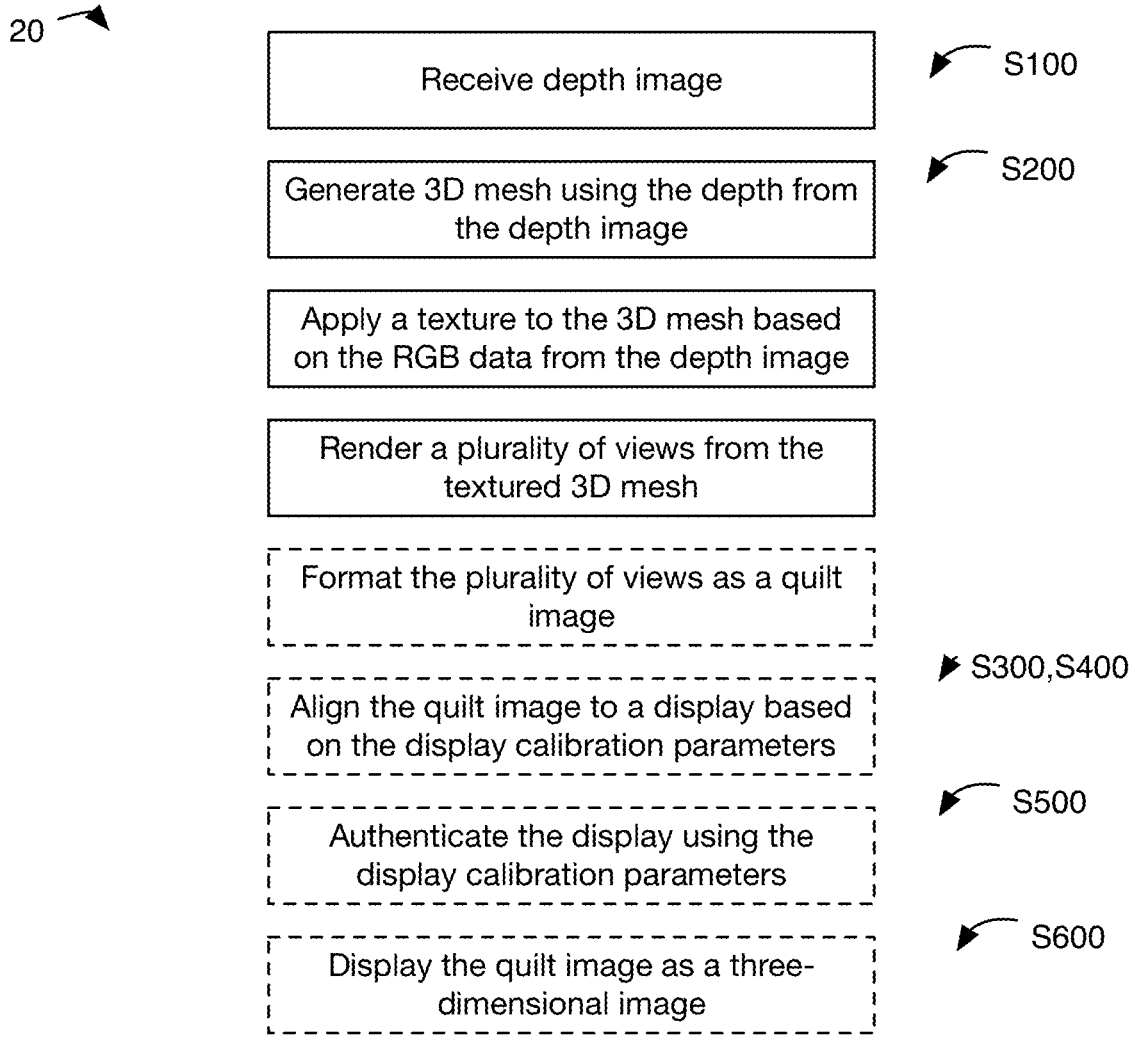
Figure 12:
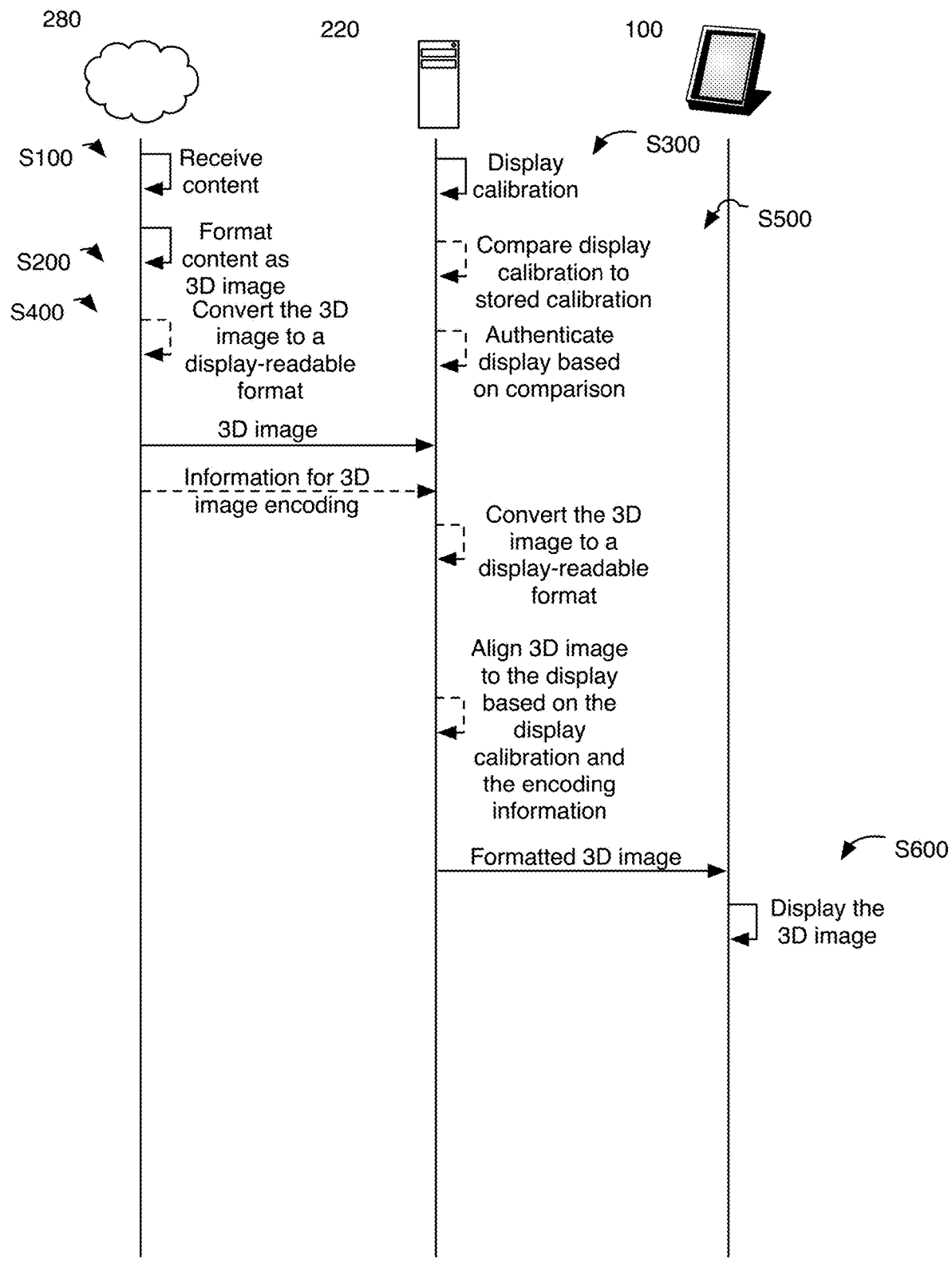
FIG. 12 is a schematic representation of a variant of the method.

In a third specific example, as shown in FIG. 11B, the method can include: receiving a depth image, generating a 3D mesh using the depth from the depth image, applying a texture to the 3D mesh based on the RGB data from the depth image, optionally detecting obstructions in the 3D mesh (e.g., where one object is in front of another), optionally applying an interpolated texture based on an estimated neighboring points of the mesh, rendering a plurality of views from the textured 3D mesh, optionally formatting the plurality of views as a quilt image, optionally aligning the quilt image to a display based on the display calibration parameters, optionally authenticating the display using the display calibration parameters (e.g., compared to a stored calibration parameter), and displaying a three dimensional image.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for displaying a three-dimensional (3D) image using a 3D display comprising:
receiving the 3D image;
receiving a set of calibration parameters associated with the 3D display;
converting the set of calibration parameters into a calibration hash using a hash key;
comparing the calibration hash to a stored authentication hash;
when the calibration hash matches the stored authentication hash, providing the set of calibration parameters to a processor;
at the processor, converting the 3D image to a format readable by the 3D display using the set of calibration parameters; and
displaying the 3D image using the 3D display.

2. The method of claim 1, wherein the calibration parameters comprise a serial number, a lenticular pitch, a lenticular tilt, and a lenticular slope.

3. The method of claim 1, wherein the 3D display is configured to display the 3D image to a plurality of viewers contemporaneously, wherein each viewer of the plurality of viewers perceives the 3D image as 3D without using peripherals.

4. The method of claim 1, wherein converting the 3D image to the format readable by the 3D display comprises aligning the 3D image to subpixels of the 3D display based on the set of calibration parameters.

5. The method of claim 1, further comprising, when the calibration hash does not match the stored authentication hash:
converting the set of calibration parameters into a second calibration hash using a second hash key;
comparing the second calibration hash to the stored authentication hash; and
when the second calibration hash matches the stored authentication hash, preventing the processor from accessing the set of calibration parameters.

6. The method of claim 5, further comprising generating the stored authentication hash when the stored authentication hash does not exist.

7. The method of claim 6, wherein generating the stored authentication hash comprises, at a server:
receiving the set of calibration parameters;
determining whether the 3D display has previously been registered;
determining whether the set of calibration parameters were stored on the server independent of receiving the set of calibration parameters;
when the 3D display has not been registered and the set of calibration parameters were independently stored on the server, generating the stored authentication hash using the hash key; and
when the 3D display has been registered or the set of calibration parameters were not independently stored on the server, generating the stored authentication hash using the second hash key.

8. The method of claim 1, wherein receiving the 3D image comprising receiving a depth image, wherein converting the 3D image to a format readable by the 3D display comprises generating a plurality of views each associated with a different perspective of the subject of the 3D image, wherein the plurality of views are arranged based on their perspective, wherein the plurality of views are stored as a quilt image.

9. A system comprising:
a display configured to display a scene from a plurality of different perspectives, wherein the scene is perceivable as three-dimensional (3D);
a processing system configured to:
receive content associated with the scene;
render the content in a display-readable format; and
when the display is associated with display calibration data, authenticate the display based on the display calibration data.

10. The system of claim 9, wherein the processing system is distributed between a server and a display processor, wherein the server is configured to:
receive the content;
render the content; and
transmit the content to the display processor; and
wherein the display processor is configured to authenticate the display.

11. The system of claim 10, wherein the display comprises a lenticular array aligned to pixels of the display, wherein the display calibration data comprises at least one of a pitch of the lenticular array, a tilt angle of the lenticular array, or a slope of the lenticular array.

12. The system of claim 11, wherein the display processor is configured to align the content to pixels of the display based on at least one of the pitch, the tilt angle, or the slope of the lenticular array.

13. The system of claim 9, wherein the display-readable format comprises:
at least one of a depth image, a depth quilt image, a quilt image, or stereoimages; and
metadata comprising information for how to process the display-readable format.

14. The system of claim 9, wherein the content comprises at least one of a depth image, a portrait image, a photoset, lightfield panning video, side-by-side video, a 3D model, or a chroma depth image.

15. The system of claim 14, wherein the content comprises a depth image, wherein the processing system renders the content by:
generating a 3D mesh based on depth information encoded by the depth image;
applying a texture to the 3D mesh based on color information encoded by the depth image;
generating a plurality of views of the 3D mesh, each view of the plurality of views generated from a different perspective; and
storing the plurality of views in a shared container in an order based on the perspective of each view of the plurality of views.

16. The system of claim 9, wherein the processing system is configured to authenticate the display by:
converting the display calibration data into a calibration hash using a first hash key;
comparing the calibration hash to a stored authentication hash; and
when the calibration hash matches the stored authentication hash, authenticating the display.

17. The system of claim 16, wherein when the calibration hash does not match the stored authentication hash, the processor is configured to:
convert the display calibration data into a second calibration hash using a second hash key;
compare the second calibration hash to the stored authentication hash; and
when the second calibration hash matches the stored authentication hash, fail to authenticate the display.

18. The system of claim 16, wherein the processing system is further configured to generate the stored authentication hash when the stored authentication hash does not exist.

19. The system of claim 18, wherein the processing system is configured to generate the stored authentication hash by:
determining whether the display has previously been registered;
determining whether the display calibration data was stored on the server;
when the 3D display has not previously been registered and the display calibration data was stored on the server, generating the stored authentication hash using the first hash key; and
when the 3D display has been registered or the set of calibration parameters were not stored on the server, generating the stored authentication hash using a second hash key that is different from the first hash key.

20. The system of claim 9, wherein the display comprises at least one of a computer monitor, a mobile phone display, a head-mounted display, or a stereoscopic display.

* * * * *